(12) United States Patent
Arita et al.

(10) Patent No.: US 12,283,044 B2
(45) Date of Patent: Apr. 22, 2025

(54) OPHTHALMIC IMAGE PROCESSING METHOD, OPHTHALMIC IMAGE PROCESSING DEVICE, AND OPHTHALMIC IMAGE PROCESSING PROGRAM

(71) Applicant: Kowa Company, Ltd., Nagoya (JP)

(72) Inventors: Reiko Arita, Saitama (JP); Katsumi Yabusaki, Tokyo (JP); Miyako Suzuki, Tokyo (JP)

(73) Assignee: Kowa Company, Ltd., Nagoya (JP)

( * ) Notice: Subject to any disclaimer, the term of this patent is extended or adjusted under 35 U.S.C. 154(b) by 391 days.

(21) Appl. No.: 17/788,949

(22) PCT Filed: Dec. 23, 2020

(86) PCT No.: PCT/JP2020/048106
§ 371 (c)(1),
(2) Date: Jun. 24, 2022

(87) PCT Pub. No.: WO2021/132307
PCT Pub. Date: Jul. 1, 2021

(65) Prior Publication Data
US 2023/0025493 A1    Jan. 26, 2023

(30) Foreign Application Priority Data

Dec. 24, 2019 (JP) .................... 2019-232939
Feb. 27, 2020 (JP) .................... 2020-031297

(51) Int. Cl.
*G06T 7/00* (2017.01)
*G06T 7/13* (2017.01)
*G06V 10/44* (2022.01)

(52) U.S. Cl.
CPC .............. *G06T 7/0012* (2013.01); *G06T 7/13* (2017.01); *G06V 10/44* (2022.01); *G06T 2207/20081* (2013.01); *G06T 2207/30041* (2013.01)

(58) Field of Classification Search
CPC ............... G06T 7/0012; G06T 7/13; G06T 2207/20081; G06T 2207/30041; G06V 10/44
(Continued)

(56) References Cited

U.S. PATENT DOCUMENTS 10,468,142 B1    11/2019 Abou Shousha et al.
2019/0122350 A1    4/2019 Yang et al.
(Continued)

FOREIGN PATENT DOCUMENTS

JP    2005211173 A    8/2005
JP    2018089301 A    6/2018
(Continued)

OTHER PUBLICATIONS

Supplementary European Search Report for European Patent Application No. 20906814.7, dated Dec. 11, 2023, pp. all.
(Continued)

*Primary Examiner* — Ayodeji O Ayotunde
(74) *Attorney, Agent, or Firm* — Dorsey & Whitney LLP

(57) ABSTRACT

An ophthalmic image of an evaluation target is acquired, a plurality of subsection images is extracted from the ophthalmic image, a state of a subject's eye is predicted for each of the subsection images based on a learned model in which learning has been performed in advance regarding extracting a plurality of subsection images from an ophthalmic image for learning, and predicting a state of a subject's eye for the each of subsection image by machine learning using correct answer data related to a state of each subsection image, and
(Continued)

the subsection image is extracted from the ophthalmic image so as to have an image size corresponding to a state of a subject's eye of an evaluation target.

20 Claims, 25 Drawing Sheets

(58) Field of Classification Search
USPC .......................................................... 382/128
See application file for complete search history.

(56) References Cited

U.S. PATENT DOCUMENTS

| | | | |
|---|---|---|---|
| 2021/0093193 A1* | 4/2021 | Birkner | ................. G06T 7/0012 |
| 2021/0212561 A1 | 7/2021 | Arita et al. | |

FOREIGN PATENT DOCUMENTS

| | | | | |
|---|---|---|---|---|
| JP | 2018121886 A | | 8/2018 | |
| WO | WO-2016014607 A1 * | | 1/2016 | ............. G06F 18/23 |
| WO | 2019168142 A1 | | 9/2019 | |

OTHER PUBLICATIONS

Bron, Anthony J., "Diagnosis of Dry Eye", Survey of Ophthalmology, vol. 45, 1, Mar. 1, 2001, pp. S221-S226, all.

Remeseiro-Lopez, L. Ramos, et al., "Colour Texture Segmentation of Tear Film Lipid Layer Images", 18th International Conference, Austin, TX, USA, Feb. 10, 2013, pp. 140-147, all.

Su, Tai-Yuan , et al., "Tear Film Break-Up Time Measurement Using Deep Convolutional Neural Networks for Screening Dry Eye Disease", IEEE Sensors Journal, IEEE, USA, vol. 18, No. 16, Aug. 5, 2018, pp. all.

Yabusaki, Katsumi , et al., "Automated Classification Of Dry Eye Type Analyzing Interference Fringe Color Images Of Tear Film Using Machine Learning Techniques", Modeling and Artificial Intelligence in Ophthalmology, vol. 2, No. 3, Jun. 5, 2019, pp. 28-35, all.

International Search Report and Written Opinion [English Translation for ISR only] dated Mar. 16, 2021 for PCT Application No. PCT/JP2020/048106.

* cited by examiner

HEALTHY SUBJECT
(P:Pearl)

EVAPORATIVE
(C:Crystal)

TEAR DECREASING
(J:Jupiter)

8 × 8 PIXELS

IMPOSSIBLE TO DETECT FRINGE PATTERN

24 × 24 PIXELS

DIFFICULT TO DETECT FRINGE PATTERN

48 × 48 PIXELS

POSSIBLE TO DETECT FRINGE PATTERN

OPHTHALMIC IMAGE
OF PREDICTION TARGET

OPHTHALMIC IMAGE ON WHICH REDICTION
RESULT IS SUPERIMPOSED AND DISPLAYED

OPHTHALMIC IMAGE PROCESSING METHOD, OPHTHALMIC IMAGE PROCESSING DEVICE, AND OPHTHALMIC IMAGE PROCESSING PROGRAM

CROSS REFERENCE TO RELATED APPLICATION(S)

This application is a U.S. National Stage filing under 35 U.S.C. § 371 of PCT Application No. PCT/JP2020/048106, filed Dec. 23, 2020, which claims priority to Japanese Application No. 2019-232939 filed Dec. 24, 2019, and Japanese Application No. 2020-031297, filed Feb. 27, 2020, which are incorporated herein by reference, in their entirety.

TECHNICAL FIELD

The present invention relates to an ophthalmic image processing method, an ophthalmic image processing device, and an ophthalmic image processing program for analyzing a state of a subject's eye.

BACKGROUND ART

Various methods have conventionally been proposed in which a subject's eye is shot and a state of the subject's eye is evaluated by a computer using the shot image. For example, Patent Literature 1 has been proposed as an ophthalmic device for diagnosing dry eye.

Patent Literature 1 discloses an ophthalmic device that carries out color imaging of an interference pattern in a tear film of the subject's eye created by illumination, resolves a captured color image into a plurality of color components, determines an interference pattern appearing in each color component from a signal of each resolved color component, and calculates a value showing the stage of progress of dry eye from the number of the interference patterns determined in each color component or a signal level variation of the interference pattern determined.

CITATION LIST

Patent Literature

Patent Literature 1: JP 2005-211173 A

SUMMARY OF INVENTION

Technical Problem

According to the ophthalmic device described in Patent Literature 1, the progress state of dry eye can be accurately and properly quantified. However, this Patent Literature 1 has a configuration in which a considerably wide region in a subject's eye is set as an analysis area, and an interference fringe is determined based on at least one analysis line-shaped signal level in the analysis area. That is, it is possible to determine the state of the interference fringe of the entire subject's eye, but it is not possible to evaluate the state of the subject's eye for each detail.

In general, a method of evaluating one entire ophthalmic image has an advantage that analysis time is short because the result can be obtained simply by analyzing one image, but on the other hand, there are disadvantages that (1) diagnosis support ability is low because existence of an extraction target can be predicted, but it is not known which site of the image the extraction target exists in, (2) it is extremely difficult to extract a structure or a characteristic of a target that exists only in a small part of the image, (3) it is assumed that an element of noise (a region of eyelash having strong contrast or a contour of a pupil in an interference fringe image) is erroneously captured as an extraction target, and (4) it is necessary to prepare many images for the purpose of improving prediction accuracy. Therefore, there has been a demand for an ophthalmic image processing method capable of solving these problems and finely analyzing not only the state of an interference fringe but also the state of a subject's eye such as the presence or absence of occurrence of a break.

The present invention has been made in view of the above problems, and an object is to provide an ophthalmic image processing method, an ophthalmic image processing device, and an ophthalmic image processing program for highly accurately predicting the state of a subject's eye and enabling detailed analysis.

Solution to Problem

An ophthalmic image processing method according to the present invention is an ophthalmic image processing method for evaluating a state of a subject's eye from an ophthalmic image in which a subject's eye is shot using machine learning, the ophthalmic image processing method including: a learning step of obtaining a learned model by performing learning in advance regarding extracting a plurality of subsection images from an ophthalmic image for learning, and predicting a state of a subject's eye for each subsection image by machine learning using correct answer data related to a state of each subsection image; an image acquisition step of acquiring an ophthalmic image for a test; an extraction step of extracting a plurality of subsection images from an ophthalmic image for a test; and a prediction step of predicting a state of a subject's eye of each subsection image using the learned model, in which the subsection image is extracted from the ophthalmic image so as to have an image size corresponding to a state of a subject's eye of an evaluation target.

The ophthalmic image processing method according to the present invention further includes: a result reflection region setting step of setting a result reflection region that is a region having a predetermined size equal to or less than a size of the subsection image, the result reflection region for reflecting a prediction result of the subsection image, in which in the extraction step, a region that includes the result reflection region and has a predetermined size equal to or greater than the result reflection region is extracted as the subsection image so as to correspond to each of the result reflection regions, and in the prediction step, a prediction result obtained for each of the subsection images is reflected to the result reflection region that corresponds.

The ophthalmic image processing method according to the present invention further including: an edge image generation step of extracting an edge from the ophthalmic image to generate an edge image, in which in the prediction step, when a luminance value in the edge image corresponding to a position of the result reflection region is equal to or greater than a predetermined threshold, the subsection image corresponding to the result reflection region is set as a target of prediction processing.

In the ophthalmic image processing method according to the present invention, furthermore, in the prediction step, a mean luminance value is calculated for each of the subsection images, and the subsection image having a mean luminance value equal to or greater than a predetermined threshold is set as a target of prediction processing.

The ophthalmic image processing method according to the present invention further includes a prediction result display step of causing a display means to display an image indicating a prediction result superimposed and displayed on the ophthalmic image.

In the ophthalmic image processing method according to the present invention, furthermore, in the image acquisition step, a plurality of ophthalmic images arranged in time series is acquired, in the prediction step, prediction processing is executed for each of a plurality of ophthalmic images, and the ophthalmic image processing method further includes a change determination step of determining whether or not a temporal change and/or a spatial change in a state of a subject's eye satisfies a predetermined condition for a prediction result obtained for each of a plurality of ophthalmic images.

In the ophthalmic image processing method according to the present invention, furthermore, a state of the subject's eye is presence or absence of an interference fringe of a tear film.

In the ophthalmic image processing method according to the present invention, furthermore, a state of the subject's eye is presence or absence of a break.

An ophthalmic image processing device according to the present invention is an ophthalmic image processing device for evaluating a state of a subject's eye from an ophthalmic image in which a subject's eye is shot, the ophthalmic image processing device including: an image acquisition unit that acquires the ophthalmic image of an evaluation target; an extraction unit that extracts a plurality of subsection images from the ophthalmic image; and a prediction unit that predicts a state of a subject's eye for each of the subsection images based on a learned model in which learning has been performed in advance regarding extracting a plurality of subsection images from an ophthalmic image for learning, and predicting a state of a subject's eye for the each of subsection image by machine learning using correct answer data related to a state of each subsection image, in which the subsection image is extracted from the ophthalmic image so as to have an image size corresponding to a state of a subject's eye of an evaluation target.

An ophthalmic image processing program according to the present invention is an ophthalmic image processing program for causing a computer to implement processing of evaluating a state of a subject's eye from an ophthalmic image in which a subject's eye is shot, the ophthalmic image processing program causing the computer to implement an image acquisition function of acquiring the ophthalmic image of an evaluation target, an extraction function of extracting a plurality of subsection images from the ophthalmic image, and a prediction function of predicting a state of a subject's eye for each of the subsection images based on a learned model in which learning has been performed in advance regarding extracting a plurality of subsection images from an ophthalmic image for learning, and predicting a state of a subject's eye for the each of subsection images by machine learning using correct answer data related to a state of each subsection image, in which the subsection image is extracted from the ophthalmic image so as to have an image size corresponding to a state of a subject's eye of an evaluation target.

The ophthalmic image processing method according to the present invention is an ophthalmic image processing method for evaluating a state of dry eye of a subject's eye from an ophthalmic image in which a subject's eye is shot using machine learning, the ophthalmic image processing method including: a learning step of obtaining a learned model by performing learning in advance regarding extracting a plurality of subsection images from an ophthalmic image for learning, and, using correct answer data related to a state of each subsection image, predicting, for each subsection image by machine learning, which of at least a healthy state, a state of tear decreasing dry eye, and a state of evaporative dry eye a state of dry eye of a subject's eye corresponds to; an image acquisition step of acquiring an ophthalmic image for a test; an extraction step of extracting a plurality of subsection images from an ophthalmic image for a test; and a prediction step of predicting a state of dry eye of a subject's eye of each subsection image using the learned model, in which the subsection image is extracted from the ophthalmic image so as to have an image size that enables appropriate evaluation of a state of dry eye of a subject's eye of an evaluation target.

The ophthalmic image processing method according to the present invention further includes: a result reflection region setting step of setting a result reflection region that is a region having a predetermined size equal to or less than a size of the subsection image, the result reflection region for reflecting a prediction result of the subsection image, in which in the extraction step, a region that includes the result reflection region and has a predetermined size equal to or greater than the result reflection region is extracted as the subsection image so as to correspond to each of the result reflection regions, and in the prediction step, a prediction result obtained for each of the subsection images is reflected to the result reflection region that corresponds.

In the ophthalmic image processing method according to the present invention, furthermore, in the prediction step, a mean luminance value is calculated for each of the subsection images, and the subsection image having a mean luminance value equal to or greater than a predetermined threshold is set as a target of prediction processing.

The ophthalmic image processing method according to the present invention further includes a prediction result display step of causing a display means to display an image indicating a prediction result superimposed on the ophthalmic image.

In the ophthalmic image processing method according to the present invention, furthermore, in the image acquisition step, a plurality of ophthalmic images arranged in time series is acquired, in the prediction step, prediction processing is executed for each of a plurality of ophthalmic images, and the ophthalmic image processing method further includes a change determination step of determining whether or not a temporal change and/or a spatial change in a state of dry eye of a subject's eye satisfies a predetermined condition for a prediction result obtained for each of a plurality of ophthalmic images.

An ophthalmic image processing device according to the present invention is an ophthalmic image processing device for evaluating a state of dry eye of a subject's eye from an ophthalmic image in which a subject's eye is shot, the ophthalmic image processing device including: an image acquisition unit that acquires the ophthalmic image of an evaluation target; an extraction unit that extracts a plurality of subsection images from the ophthalmic image; and a prediction unit that predicts a state of dry eye of a subject's eye for each subsection image based on a learned model in which learning has been performed in advance regarding extracting a plurality of subsection images from an ophthalmic image for learning, and, using correct answer data related to a state of each subsection image, predicting, for each subsection image by machine learning, which of at least a healthy state, a state of tear decreasing dry eye, and a state of evaporative dry eye a state of dry eye of a subject's eye corresponds to, in which the subsection image is extracted from the ophthalmic image so as to have an image size corresponding to a state of a subject's eye of an evaluation target.

An ophthalmic image processing program according to the present invention is an ophthalmic image processing program for causing a computer to implement processing of evaluating a state of dry eye of a subject's eye from an ophthalmic image in which a subject's eye is shot, the ophthalmic image processing program causing the computer to implement an image acquisition function of acquiring the ophthalmic image of an evaluation target, an extraction function of extracting a plurality of subsection images from the ophthalmic image, and a prediction function of predicting a state of dry eye of a subject's eye for each subsection image based on a learned model in which learning has been performed in advance regarding extracting a plurality of subsection images from an ophthalmic image for learning, and, using correct answer data related to a state of each subsection image, predicting, for each subsection image by machine learning, which of at least a healthy state, a state of tear decreasing dry eye, and a state of evaporative dry eye a state of dry eye of a subject's eye corresponds to, in which the subsection image is extracted from the ophthalmic image so as to have an image size that enables appropriate evaluation of a state of dry eye of a subject's eye of an evaluation target.

Advantageous Effects of Invention

One or two or more deficiencies are solved by the embodiments of the present application.

DESCRIPTION OF EMBODIMENTS

Examples of the embodiments of the present invention will be described below with reference to the drawings. Note that various constituent elements in the examples of the embodiments described below can be appropriately combined as long as no contradiction or the like occurs. Description of content explained as an example of an embodiment is sometimes omitted in other embodiments. The content of operations and processing that are not related to the characteristic parts of each embodiment is sometimes omitted. Furthermore, the order of various types of processing constituting various flows described below is random as long as no contradiction or the like occurs in the processing content.

First Embodiment

Hereinafter, an example of an ophthalmic image processing system according to a first embodiment of the present invention will be described with reference to the drawings. As described later, the ophthalmic image processing system of the present invention can be achieved as a single ophthalmic image processing device that does not need to be connected to another device via a communication network, and thus is not necessarily required to be an ophthalmic image processing system. The following description will be given on the premise that there is a case where the ophthalmic image processing system of the present invention functions as an ophthalmic image processing system.

Figure 1:
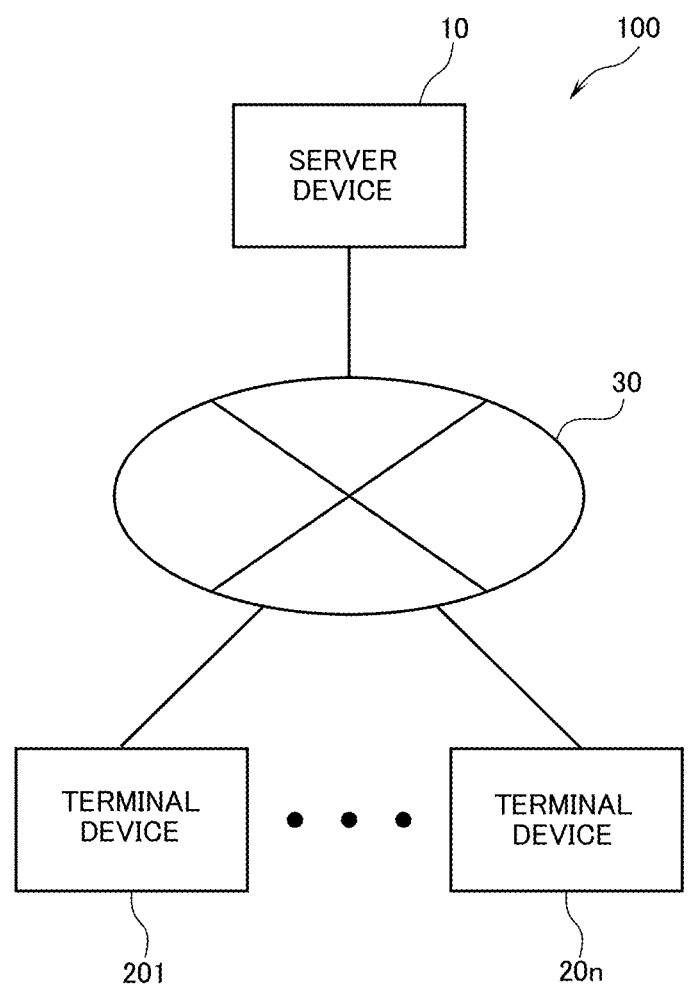
FIG. 1 is a block diagram that illustrates an example of a configuration of an ophthalmic image processing system corresponding to at least one of the embodiments of the present invention.

FIG. 1 is a block diagram that illustrates an example of the configuration of the ophthalmic image processing system corresponding to at least one of the embodiments of the present invention. As illustrated in FIG. 1, an ophthalmic image processing system 100 is configured such that a server device 10 and terminal devices 201 to 20n (hereinafter, they are sometimes expressed as terminal device 20) can be connected to one another via a communication network 30. For example, the server device 10 in FIG. 1 may function as an ophthalmic image processing device, and the server device 10 functioning as an ophthalmic image processing device may be connected for use from any of the plurality of terminal devices 201 to 20n via the communication network. At this time, a program for using the ophthalmic image processing device may be installed in the terminal device 20, or a program on the server may be used via a browser.

An identical device does not need to include all the constituent elements of the ophthalmic image processing device described below. Some components may be included in another device, for example, some components may be included in the server device 10 and any of the plurality of terminal devices 201 to 20n that can be connected via the communication network, and in this manner, a configuration included in another device may be used while the ophthalmic image processing device performs communication. Not only one server device 10 but also a plurality of server devices may be used. A learned model described later may be distributed in the server device 10, the plurality of terminal devices 201 to 20n, and the like as other devices in addition to being stored in the device as an ophthalmic image processing device, and may be connected via the communication network each time for use to the device including the learned model to be used. That is, as long as a learned model stored by any storage means is available, it does not matter whether a learned model storage means is included in the ophthalmic image processing device itself or another device.

Figure 2:
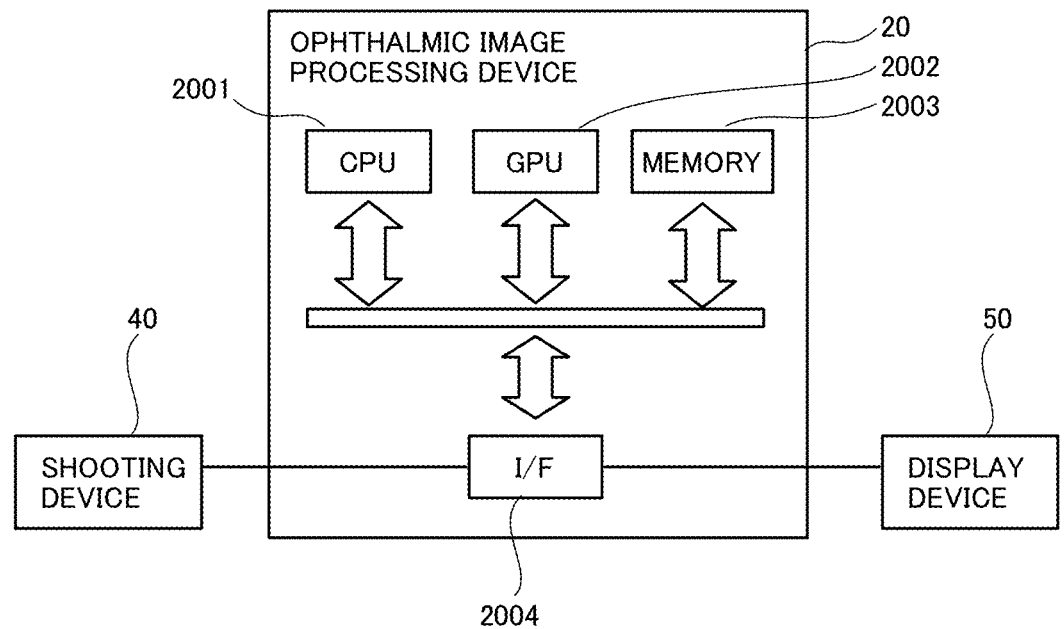
FIG. 2 is a block diagram that illustrates an example of a configuration of an ophthalmic image processing device and a peripheral device corresponding to at least one of the embodiments of the present invention.

FIG. 2 is a block diagram that illustrates an example of the configuration of the ophthalmic image processing device and the peripheral device corresponding to at least one of the embodiments of the present invention. Note that, in the following description, in order to describe a case where the terminal device 20 functions as an ophthalmic image processing device as an example, the description will be given with the same reference sign as that of the terminal device such as the ophthalmic image processing device 20, but the present invention is not limited to this.

An ophthalmic image processing device 20 may be a device designed as a dedicated machine, but can be implemented by a general computer. That is, as illustrated in FIG. 2, the ophthalmic image processing device 20 includes at least a central processing unit (CPU) 2001, a graphics processing unit (GPU) 2002, and a memory 2003, which are likely to be normally included in a general computer. The ophthalmic image processing device 20 is connected to each of a shooting device 40 and a display device 50 via an interface (I/F) 2003. An input device such as a mouse and a keyboard, an output device such as a printer, and a communication device for connecting to a communication network may be connected via a bus. Processing in each unit of the ophthalmic image processing device 20 is carried out by reading a program for executing the processing in each unit from the memory and executing the program in a CPU or a GPU that functions as a control circuit (processing circuit or processing circuitry). In other words, by executing the program, the processor (processing circuit) can execute each processing of each device. The shooting device 40 is used to shoot an ophthalmic image, and the display device 50 is used to display an image indicating a prediction result superimposed and displayed on the ophthalmic image, for example.

Figure 3:
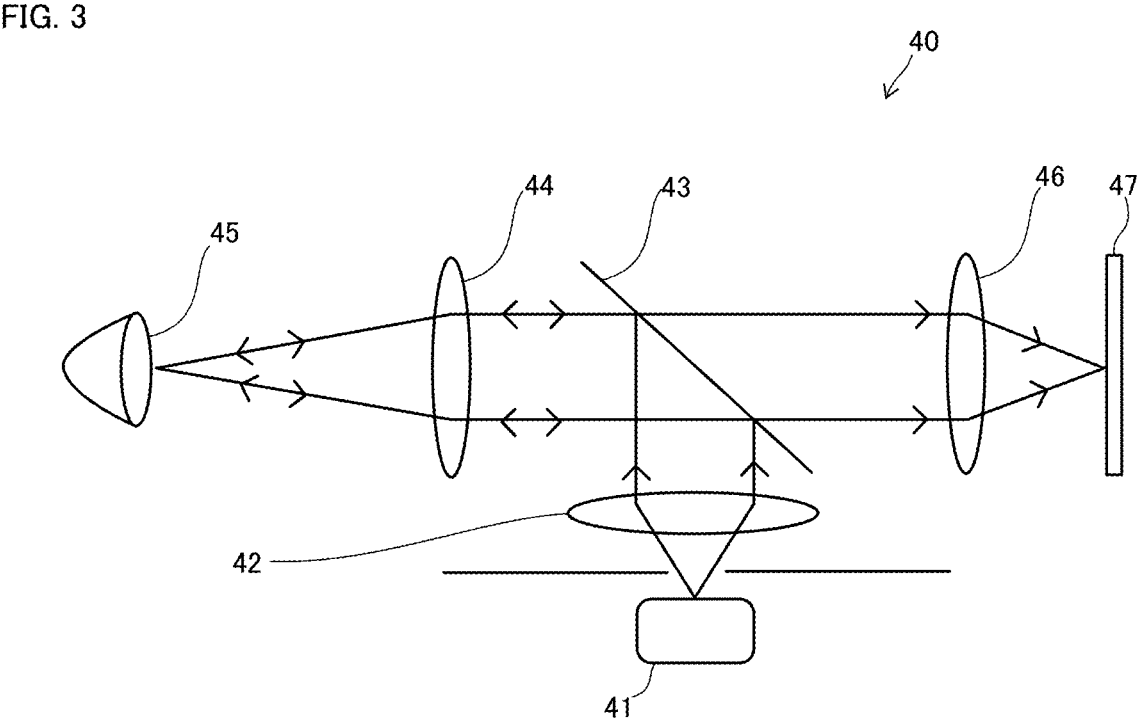
FIG. 3 is an explanatory diagram that illustrates an example of a configuration of a shooting device corresponding to at least one of the embodiments of the present invention.

FIG. 3 is an explanatory diagram that illustrates an example of the configuration of the shooting device corresponding to at least one of the embodiments of the present invention. The shooting device 40 is only required to be able to record, as digital data, an image on which a subject's eye of a shooting target appears, and a conventionally known device may be appropriately used, but, for example, as schematically illustrated in FIG. 3, in the shooting device 40, a light beam emitted from a light source 41 including a white LED passes through a diaphragm and is condensed on an anterior eye part 45 of the subject's eye through a lens 42, a splitter 43, and an objective lens 44 in this order. The reflected light from the anterior eye part 45 passes through the objective lens 44 and the splitter 43, and is imaged on an imaging element 47 via an imaging lens 46. The shooting data imaged on the imaging element 47 is subjected to predetermined processing by an image processing engine, and is converted into image data and moving image data. An ophthalmic image shot by this shooting device 40 is transmitted to the ophthalmic image processing device 20. In the following description, there is a case where the expression "image" appears as in ophthalmic image and subsection image, but it is assumed that that expression includes not only the content indicated by "image" but also data of the image.

Figure 4:
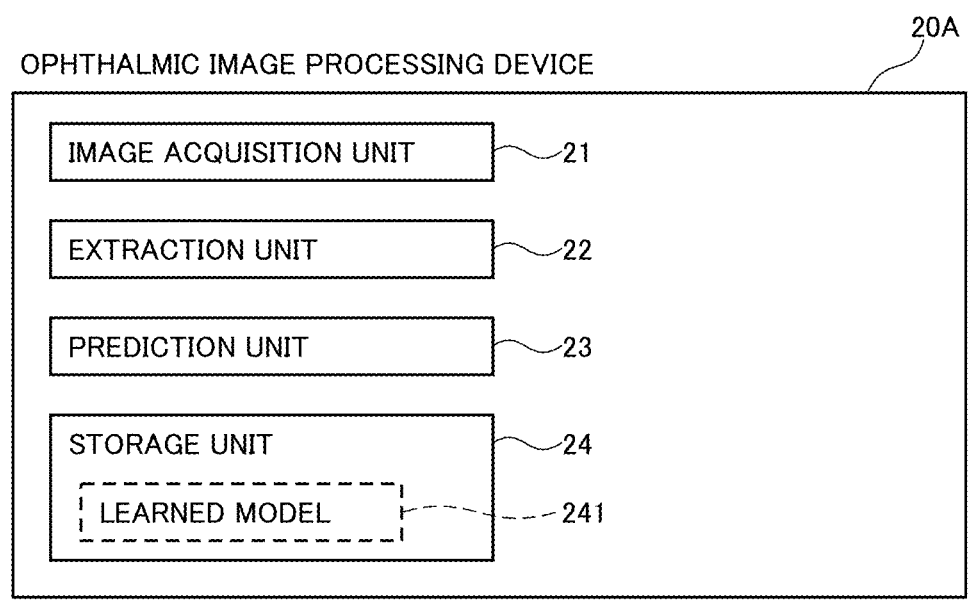
FIG. 4 is a block diagram that illustrates an example of a configuration of an ophthalmic image processing device corresponding to at least one of the embodiments of the present invention.

The configuration of the ophthalmic image processing device 20 will be described as an ophthalmic image processing device 20A in the first embodiment in FIG. 4. FIG. 4 is a block diagram that illustrates an example of the configuration of the ophthalmic image processing device corresponding to at least one of the embodiments of the present invention. As illustrated in FIG. 4, the ophthalmic image processing device 20A includes an image acquisition unit 21, an extraction unit 22, a prediction unit 23, and a storage unit 24.

The image acquisition unit 21 has a function of acquiring an ophthalmic image. Here, the ophthalmic image refers to an image obtained by shooting a target subject's eye. The ophthalmic image is shot with a shooting target area and a shooting technique that can evaluate the state of the subject's eye of the evaluation target. The state of the subject's eye refers to a specific state that can be used for evaluation of the subject's eye, and examples thereof include generation of an interference fringe in a tear film and presence or absence of a break in the tear film. The ophthalmic image is not limited to a shot image of the surface of the subject's eye, and an image obtained by a fundus camera, a scanning laser ophthalmoscope (SLO), an optical coherence tomography (OCT), or the like can also be adopted as an ophthalmic image of this example. The states of the subject's eye in the case of the fundus camera and the SLO includes angioplany, pigmentation associated with the bleeding history, abnormality of the shape of the optic disc, and a state of whether accumulation of lipid, presence of a cleft, and the like are normal or abnormal. The states of the subject's eye in the case of the OCT include, in addition to those exemplified in the case of the fundus camera and the SLO, presence of edema because a tomographic image can be shot, abnormality of the layer structure of the tomographic region, and thickness of the photoreceptor part of the retina (thins when becoming abnormal). This image acquisition unit 21 acquires the ophthalmic image shot by the shooting device 40.

The extraction unit 22 has a function of extracting a plurality of subsection images from an ophthalmic image. Here, the subsection image is an image including a region having a size smaller than that of the ophthalmic image, and refers to an image having a size serving as a unit for performing prediction processing described later. The size of the subsection image is not necessarily a fixed size and can be set as appropriate, but both extreme sizes have a problem, i.e., an extremely small size makes it impossible to detect the state of the target subject's eye, and an extremely large size causes an image including many locations other than the state location of the target subject's eye to be detected as a corresponding image, and therefore, it is preferable to set the size to a size that allows the state of the target subject's eye to be appropriately detected.

The prediction unit 23 has a function of predicting the state of the subject's eye for each subsection image on the basis of a learned model in which learned has been performed in advance. The learning processing of the learned model is performed by extracting a plurality of subsection images from an ophthalmic image for learning and by predicting the state of the subject's eye for each subsection image by machine learning using correct answer data related to the state of each subsection image. As the learned model, various models can be applied as long as learning is performed by machine learning, and for example, learning of a neural network by deep learning is applicable. Furthermore, as an example, it is also possible to adopt a convolutional neural network (CNN). The sizes of the subsection image used for learning and the subsection image for test extracted by the extraction unit 22 need to be the same size. This prediction unit 23 input, into the learned model, the subsection image for test extracted by the extraction unit 22, predicts whether or not it has a feature corresponding to the state of the subject's eye, and outputs a prediction result. Note that details of the learning processing will be described later.

The storage unit 24 has a function of storing information necessary for processing of each unit in the ophthalmic image processing device 20A and also storing various types of information generated by the processing of each unit. This storage unit 24 may store a learned model 241. Note that the learned model may be stored in the server device 10 connectable via the communication network, and the server device 10 may have the function of the prediction unit 23.

Figure 5:
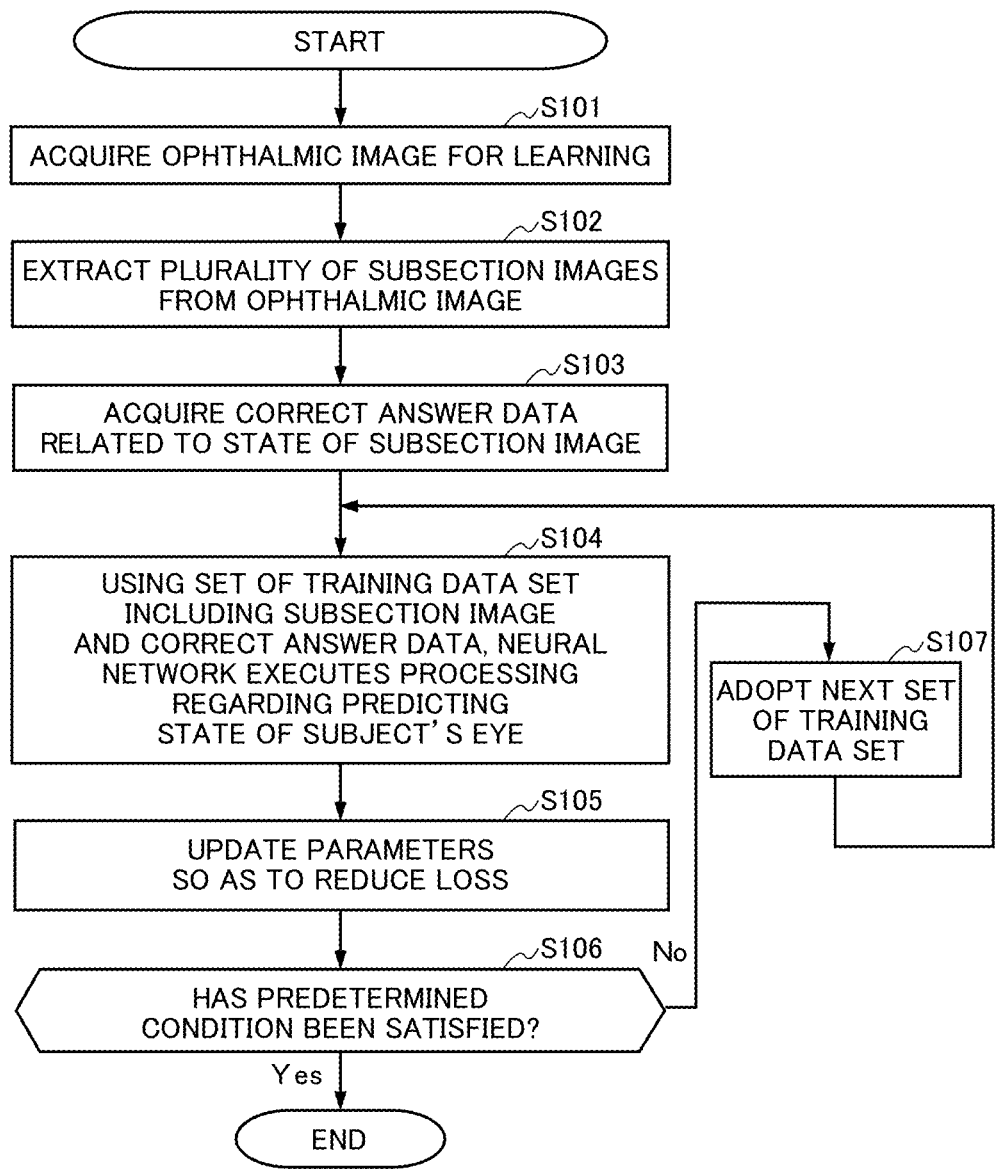
FIG. 5 is a flowchart that presents an example of a flow of learning processing corresponding to at least one of the embodiments of the present invention.

Next, the flow of learning processing corresponding to at least one of the embodiments of the present invention will be described. FIG. 5 is a flowchart that presents an example of the flow of the learning processing corresponding to at least one of the embodiments of the present invention. In FIG. 5, the learning processing is started when the ophthalmic image processing device 20A acquires an ophthalmic image for learning (step S101). It is preferable that a plurality of ophthalmic images be acquired. Next, the ophthalmic image processing device 20A extracts a plurality of subsection images from the acquired ophthalmic image (step S102). The ophthalmic image processing device 20A acquires correct answer data for each subsection image (step S103). The thus acquired subsection image and its correct answer data are stored as a set of training data set. Learning is performed using a plurality of sets of such training data sets. Next, using a set of training data set including a subsection image and its correct answer data, the ophthalmic image processing device 20A causes the neural network to execute processing of predicting the state of the subject's eye based on the input subsection image, and obtains a prediction result (step S104). Furthermore, the ophthalmic image processing device 20A obtains a loss by calculation on the basis of a loss function using the prediction result obtained by the prediction processing and the correct answer data, and updates parameters (weight, bias, and the like) of the neural network so as to reduce the loss (step S105). Then, the ophthalmic image processing device 20A determines whether or not a predetermined condition has been satisfied (step S106). The predetermined conditions here include that the number of times of trial of processing of updating parameters of the neural network has reached a predetermined number of times, and that a situation in which the value of the loss of the loss function has turned to increase after recording the minimum value is observed. If the predetermined condition has not been satisfied (S106—No), the ophthalmic image processing device 20A selects a next set of training data set (step S107), then returns to step S104, and executes the processing of S104 and S105 using the next training data set. Thus, the ophthalmic image processing device 20A repeats the processing of S104 and S105 while changing the training data set until the predetermined condition is satisfied, and ends the learning processing when the predetermined condition is satisfied (S106—Yes).

Note that how to use a plurality of sets of training data sets prepared in advance for learning can be appropriately set. For example, a plurality of sets of training data sets may be divided into a plurality of groups of a predetermined batch size, and mini-batch learning may be performed in which processing for each group serves as a boundary of one learning. When all the training data sets are used only once by performing the learning processing for all the groups in the mini-batch learning, but the learning may be set to be performed using a set of training data set a plurality of times (the number set as the number of epochs) by setting the number of epochs to a predetermined size. In addition to the case of learning the neural network from zero, transfer learning for which a learned model used for image recognition other than an ophthalmic image is diverted may be performed.

Figure 6:
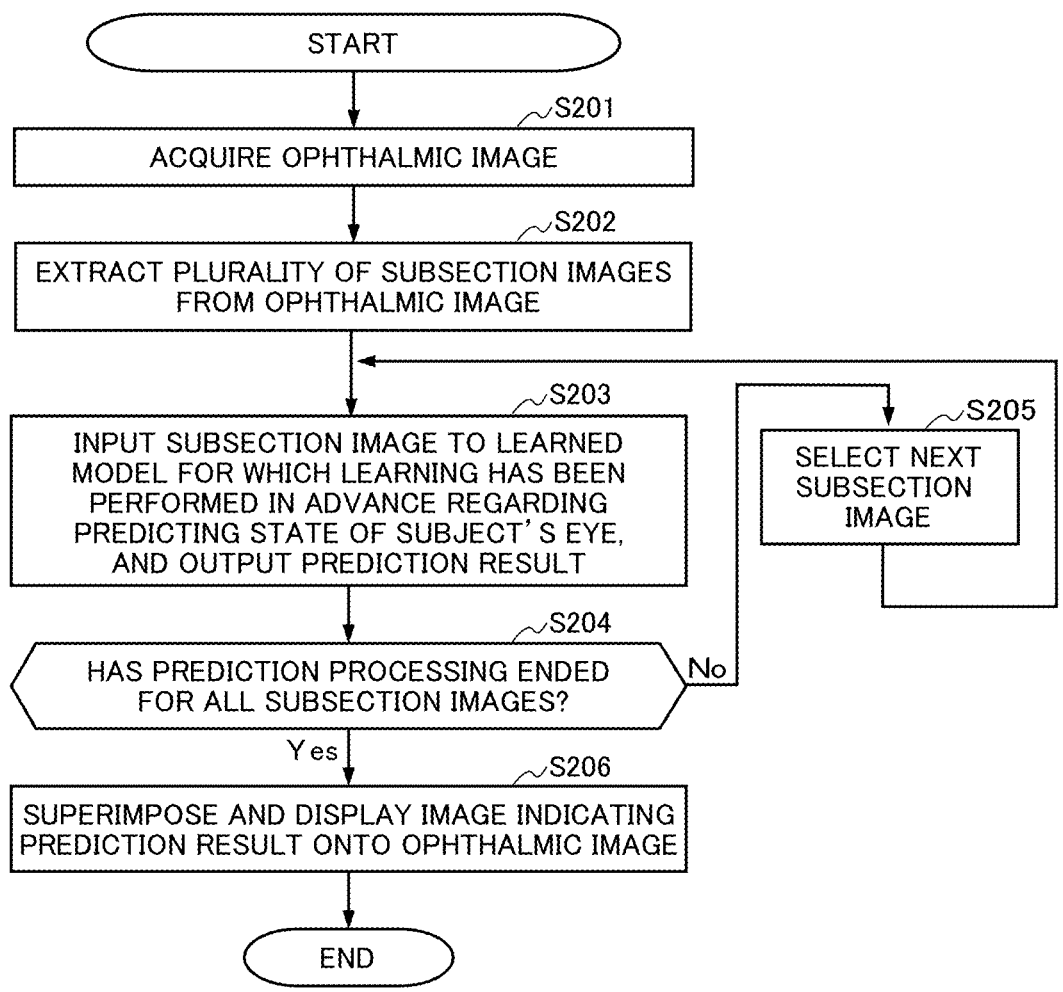
FIG. 6 is a flowchart that presents an example of a flow of prediction processing corresponding to at least one of the embodiments of the present invention.

Next, the flow of prediction processing corresponding to at least one of the embodiments of the present invention will be described. FIG. 6 is a flowchart that presents an example of the flow of the prediction processing corresponding to at least one of the embodiments of the present invention. In FIG. 6, the prediction processing is started when the ophthalmic image processing device 20A acquires an ophthalmic image for test (step S201). Next, the ophthalmic image processing device 20A extracts a plurality of subsection images from the acquired ophthalmic image (step S202). Next, the ophthalmic image processing device 20A inputs the subsection image to the learned model for which learning has been performed in advance regarding predicting the state of the subject's eye, executes the prediction processing, and obtains the prediction result (step S203). Then, the ophthalmic image processing device 20A determines whether or not the prediction processing has ended for all the subsection images (step S204). If the prediction processing has not ended for all the subsection images (S204—No), the ophthalmic image processing device 20A selects the next subsection image (step S205), and then returns to step S203. Thus, the prediction processing is sequentially executed for the subsection images, and when the prediction processing is ended for all the subsection images (S204—Yes), the ophthalmic image processing device 20A superimposes and displays an image indicating a prediction result onto the ophthalmic image (step S206), and ends the prediction processing.

Figure 7A:
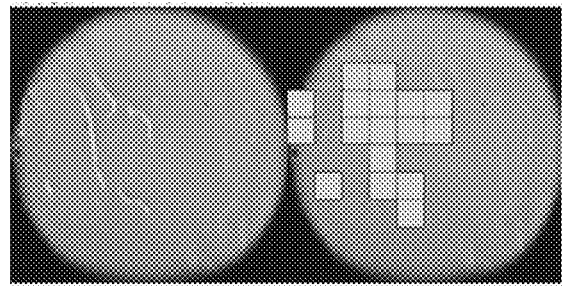
FIG. 7 is an explanatory diagram that expresses an example of an ophthalmic image before prediction processing and an ophthalmic image on which a prediction processing result is superimposed and displayed.
Figure 7B:
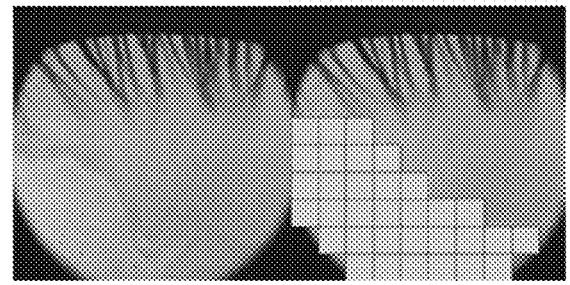

FIG. 7 is an explanatory diagram that expresses an example of an ophthalmic image before prediction processing and an ophthalmic image on which a prediction processing result is superimposed and displayed. FIG. 7(a) illustrates a case where tear breakup is learned as the state of the subject's eye to be predicted, and the left side is an acquired ophthalmic image and the right side is an image indicating the prediction result superimposed and displayed. The square location is predicted as a location where tear breakup has occurred. Each square is the size of the subsection image. It is indicated that the tear breakup to be detected is properly detected. FIG. 7(b) illustrates a case where tear interference fringe is learned as the state of the subject's eye to be predicted, and the left side is an acquired ophthalmic image and the right side is an image indicating the prediction result superimposed and displayed. The square location is predicted as a location where tear interference fringe has occurred. Each square is the size of the subsection image. It is indicated that the tear interference fringe to be detected is properly detected.

Although the size of the subsection image can be set to various sizes, it is preferable to be a size that enables accurate detection of the state of the target subject's eye. Therefore, verification was performed on the optimal size of the subsection image. In this verification, as an example, an image having a size of horizontal×vertical=640×480 pixels, which is a VGA type, was used as the size of the ophthalmic image. First, verification was performed on the optimal size of the subsection image for detection of breakup. The size of the subsection image used for learning the detection of breakup was prepared from a size of horizontal 20 pixels× vertical 20 pixels to a size of horizontal 60 pixels×vertical 60 pixels at intervals of 10 pixels, and learning and inference were performed by CNN (3-layer simple model was used). A grid of a part having breakup was manually marked, and was superimposed with a breakup site inferred with a template of each size. A cell in which both coincide with each other was defined as TP, a site in which only the manual mark was positive was defined as false negative: FN, a site in which only the mark by inference was positive was defined as false positive: FP, and a correct answer rate (R) was calculated by R=TP/(TP+FP+FN).

Figure 8:
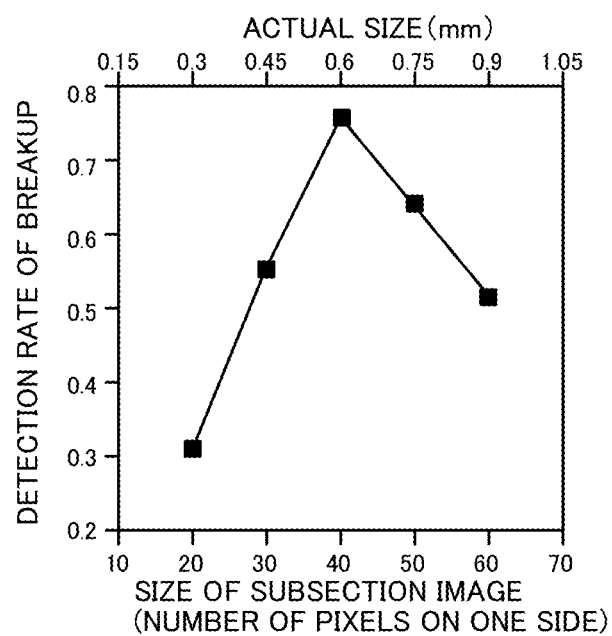
FIG. 8 is a chart that expresses a relationship between a size of a subsection image and a detection rate of breakup.

FIG. 8 is a chart that expresses the relationship between the size of a subsection image and the detection rate of breakup. As seen from FIG. 8, the graph in which the calculated correct answer rate is viewed for each subsection image size indicates that there is an obviously effective size range. In the graph, the detection rate is the highest in the case of 40 pixels×40 pixels, and the actual size in that case was a size of 0.60 mm on one side. How much correct answer rate is satisfactory is a problem that needs to be appropriately set, but for example, in a case where the correct answer rate of equal to or greater than 60% is a preferable condition, it is desirable to set the subsection image to a range of 30×30 pixels to 55×55 pixels, that is, one side of the actual size has a size of about 0.45 mm to 0.85 mm.

Next, verification was performed on the optimal size of the subsection image for detection of tear interference fringes. In this verification, as an example, an image having a size of horizontal×vertical=640×480 pixels, which is a VGA type, was used as the size of the ophthalmic image. The size of the subsection image used for learning the detection of fringe pattern was prepared from a size of horizontal 16 pixels×vertical 16 pixels to a size of horizontal 80 pixels×vertical 80 pixels at intervals of 16 pixels, and learning and inference were performed by CNN. Regarding the detection of fringe pattern, the tear interference fringe of the healthy subject is a grayish fringe pattern, but the colors (hues) of the interference fringes of the healthy subject and an evaporative dry eye patient are very similar, and it is important that improvement of the detection accuracy of the fringe is a CNN model capable of detecting the fringe itself. Therefore, in order to judge whether the template of a certain size is suitable for detection of the fringe pattern of the interference fringe image of a healthy subject, it is necessary to subtract a rate at which an image of the same hue is regarded as a healthy subject image. Therefore, a raw image of a tear interference fringe of a healthy subject having a clear fringe pattern and an image in which the fringe pattern is made unclear by blurring processing are prepared, an apparent fringe pattern detection rate of each of the original image and the blurred image in each template size was calculated, and, based on it, the detection rate of the true fringe pattern was calculated. Specifically, the true detection rate (F) of the fringe pattern was calculated by F=(f1−f2)/f1 using an apparent fringe pattern detection rate (f1) of the original image and an apparent fringe pattern detection rate (f2) of the blurred image.

Figure 9:
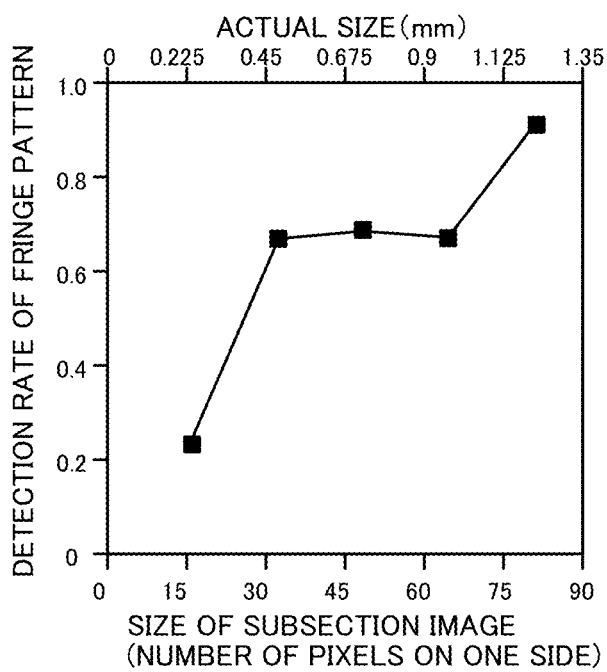
FIG. 9 is a chart that expresses a relationship between a size of a subsection image and a detection rate of a tear interference fringe.

FIG. 9 is a chart that expresses the relationship between the size of a subsection image and the detection rate of a tear interference fringe. By increasing the template size, an increase in f1 and a decrease in f2 were observed, and as a result, as illustrated in FIG. 9, it was observed that the more the size of the subsection image was increased, the more the calculated F was increased. How much detection rate is satisfactory is a problem that needs to be appropriately set, but for example, in a case where the correct answer rate of equal to or greater than 60% is a preferable condition, it is desirable to set the subsection image to a range of equal to or greater than 25×25 pixels, that is, one side of the actual size has a size of equal to or greater than about 0.35 mm.

Not limited to the examples of FIGS. 8 and 9, in a case where the size of the subsection image is decided on the basis of the prediction accuracy in predicting the state of the subject's eye, a decision method is conceivable in which the relationship between the size of the subsection image and the correct answer rate of prediction is calculated in advance and the size is set to a size that becomes equal to or greater than a predetermined correct answer rate. On the basis of a viewpoint as to what size to observe the state of the subject's eye on an actual ocular surface or a fundus part makes it possible to accurately detect the target state, a decision method of setting the size of the subsection image on the basis of the actual size occupied in the surface area of the ocular is conceivable.

As described above, since one aspect of the first embodiment includes: an image acquisition unit that acquires an ophthalmic image of an evaluation target; an extraction unit that extracts a plurality of subsection images from the ophthalmic image; and a prediction unit that predicts a state of a subject's eye for each of the subsection images based on a learned model in which learning has been performed in advance regarding extracting a plurality of subsection images from an ophthalmic image for learning, and predicting a state of a subject's eye for the each of subsection image by machine learning using correct answer data related to a state of each subsection image, in which the subsection image is extracted from the ophthalmic image so as to have an image size corresponding to a state of a subject's eye of an evaluation target, a state of a subject's eye can be highly accurately predicted, and a prediction result for each subsection image is obtained, and therefore a state of a subject's eye can be analyzed in detail.

That is, as in the present example, a configuration of extracting a plurality of subsection images from an ophthalmic image and executing prediction processing for each subsection image gives advantages such as [1] it is possible to accurately extract, with high sensitivity, even an extraction target that exists only in a small part of an image, [2] it is possible to indicate as to which site of the image to have a structure of the extraction target, and thus the ability of diagnosis support is high, [3] since one image is divided into subsections to obtain a large number of subsection images, it is easy to collect a large number of samples for improving the prediction accuracy, and [4] it is possible to construct a model that is high in robustness against noise by learning that eyelashes, contours, and the like are not extraction targets.

Second Embodiment

Hereinafter, an example of an ophthalmic image processing system according to a second embodiment of the present invention will be described with reference to the drawings. Similarly to the case of the first embodiment, the ophthalmic image processing system of the present invention can be achieved as a single ophthalmic image processing device that does not need to be connected to another device via a communication network, and thus will be described as an ophthalmic image processing device in the following description. Note that the same components as those of the first embodiment are denoted by the same reference signs, and description is sometimes omitted.

Figure 10:
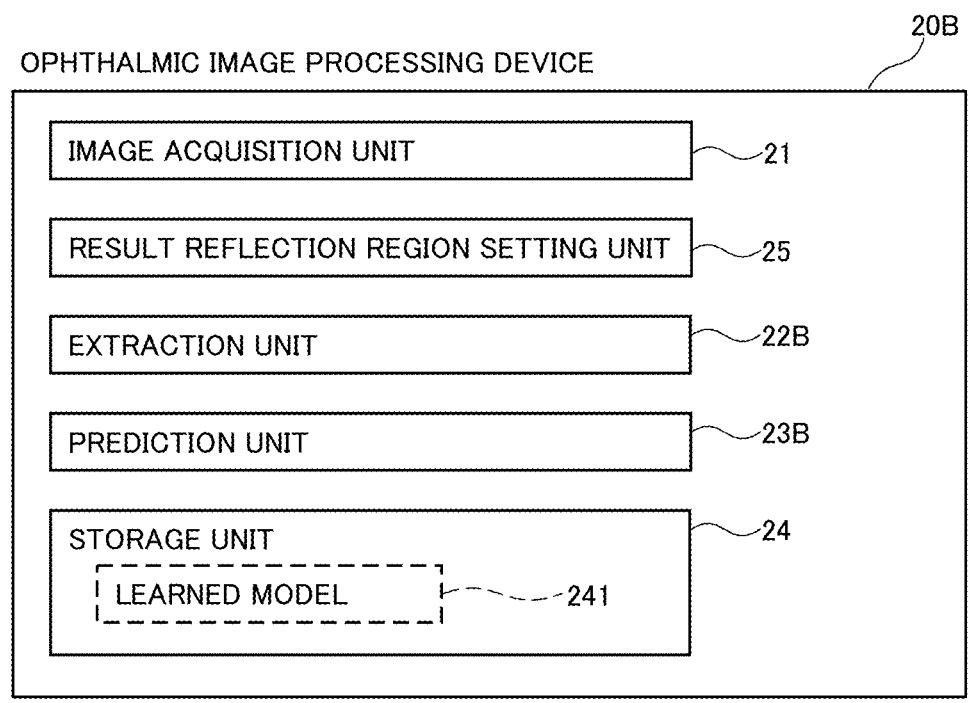
FIG. 10 is a block diagram that illustrates an example of a configuration of an ophthalmic image processing device corresponding to at least one of the embodiments of the present invention.

FIG. 10 is a block diagram that illustrates an example of the configuration of the ophthalmic image processing device corresponding to at least one of the embodiments of the present invention. As illustrated in FIG. 10, an ophthalmic image processing device 20B includes the image acquisition unit 21, a result reflection region setting unit 25, an extraction unit 22B, a prediction unit 23B, and the storage unit 24.

The result reflection region setting unit 25 has a function of setting a result reflection region that is a region having a predetermined size equal to or less than a size of the subsection image, the result reflection region for reflecting a prediction result of the subsection image. The result reflection region is a region for finally reflecting the prediction result related to the state of the subject's eye with respect to the ophthalmic image. In the first embodiment, the range of the subsection image used for prediction processing and the range in which the prediction result is reflected are the same region, but in this second embodiment, a result reflection region having a size equal to or less than the size of the subsection image used for prediction processing is set. That is, an image having a relatively large size is used for prediction processing, but a result reflection region having a relatively small size is used as a region for reflecting the result. The result reflection region may be set based on any regularity, but for example, it is preferable to fill the ophthalmic image with a plurality of result reflection regions without gaps. This result reflection region is a region set on a one-to-one basis with the subsection image. The set result reflection region is stored in the storage unit 24.

The extraction unit 22B has a function of extracting, as the subsection image, a region that includes the result reflection region and has a predetermined size equal to or greater than the result reflection region so as to correspond to each of the result reflection regions. The positional relationship between the subsection image and the result reflection region may be any relationship as long as the result reflection region is included, and, for example, it is conceivable to extract the subsection image such that the result reflection region is positioned at the center of the subsection image. As an example, an example is conceivable in which the result reflection region is set to a size of vertical 20 pixels×horizontal 20 pixels, and the subsection image is extracted in a size of vertical 48 pixels×horizontal 48 pixels such that the result reflection region is positioned at the center. Note that, since a subsection image having a size equal to or greater than the result reflection region is extracted with reference to the set result reflection region, two subsection images respectively corresponding to adjacent two result reflection regions sometimes include overlapping pixel regions. The extracted subsection image is stored in the storage unit 24.

The prediction unit 23B has a function of predicting the state of the subject's eye for each subsection image on the basis of a learned model in which learned has been performed in advance, and further has a function of reflecting the prediction result obtained for each subsection image into a corresponding result reflection region. In a case where a plurality of result reflection regions is set for one ophthalmic image, the same number of subsection images as the result reflection regions have been extracted, and therefore, the prediction processing is sequentially executed for the plurality of subsection images, and the obtained prediction result is reflected to the corresponding result reflection region. The reflection result for the result reflection region having been obtained is stored in the storage unit 24. Alternatively, an image indicating the prediction result for each result reflection region may be superimposed and displayed on the ophthalmic image, and may be output to the display device 50. Note that the learning processing for obtaining the learned model used in the prediction unit 23B is similar to that of the first embodiment, and thus description is omitted.

Figure 11:
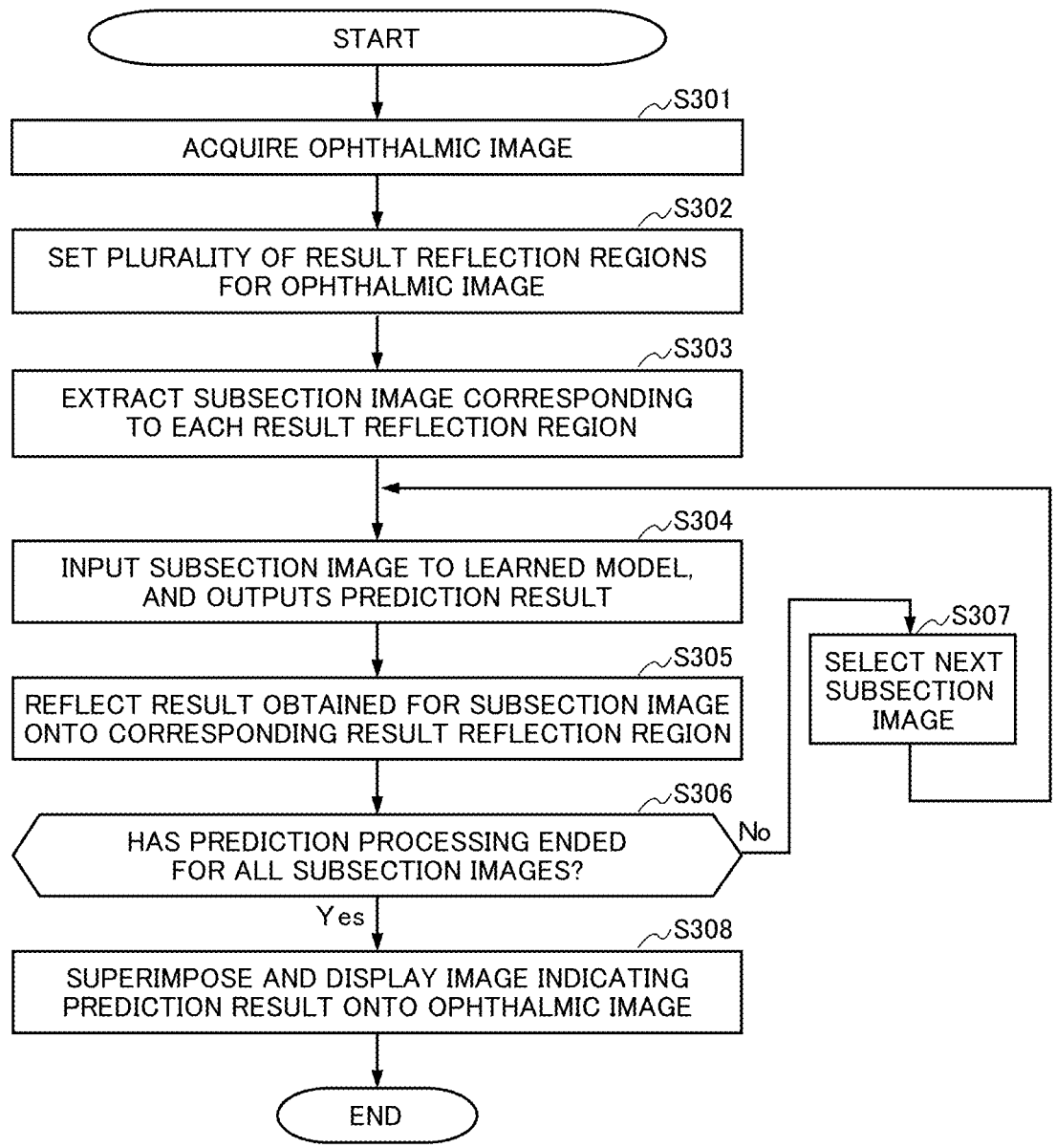
FIG. 11 is a flowchart that presents an example of a flow of prediction processing corresponding to at least one of the embodiments of the present invention.

Next, the flow of prediction processing corresponding to at least one of the embodiments of the present invention will be described. FIG. 11 is a flowchart that presents an example of the flow of the prediction processing corresponding to at least one of the embodiments of the present invention. In FIG. 11, the prediction processing is started when the ophthalmic image processing device 20B acquires an ophthalmic image for test (step S301). Next, the ophthalmic image processing device 20B sets a plurality of result reflection regions for the acquired ophthalmic image (step S302). The ophthalmic image processing device 20B extracts a subsection image corresponding to each result reflection region (step S303). Next, the ophthalmic image processing device 20B inputs the subsection image to the learned model for which learning has been performed in advance regarding predicting the state of the subject's eye, executes the prediction processing, and obtains the prediction result (step S304). The ophthalmic image processing device 20B reflects the prediction result obtained for the subsection image onto the corresponding result reflection region (step S305). Then, the ophthalmic image processing device 20B determines whether or not the prediction processing has ended for all the subsection images (step S306). If the prediction processing has not ended for all the subsection images (S306—No), the ophthalmic image processing device 20B selects the next subsection image (step S307), and then returns to step S304. Thus, the prediction processing is sequentially executed for the subsection images, and when the prediction processing is ended for all the subsection images (S306—Yes), the ophthalmic image processing device 20B superimposes and displays an image indicating a prediction result onto the ophthalmic image (step S308), and ends the prediction processing.

Figure 12A:
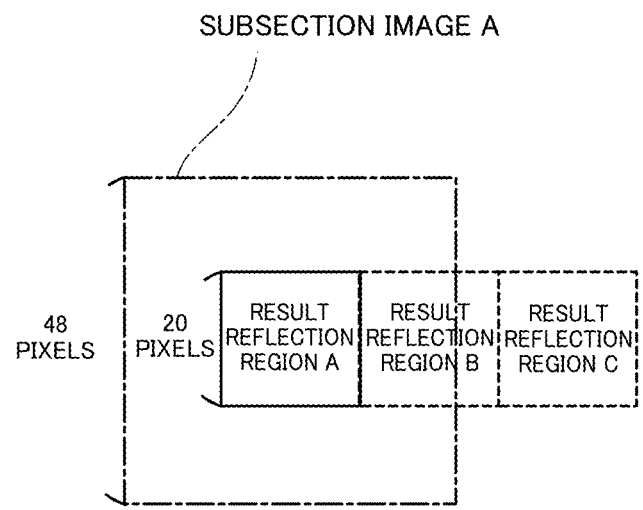
FIG. 12 is an explanatory diagram for explaining an example of setting a result reflection region and a subsection image.
Figure 12B:
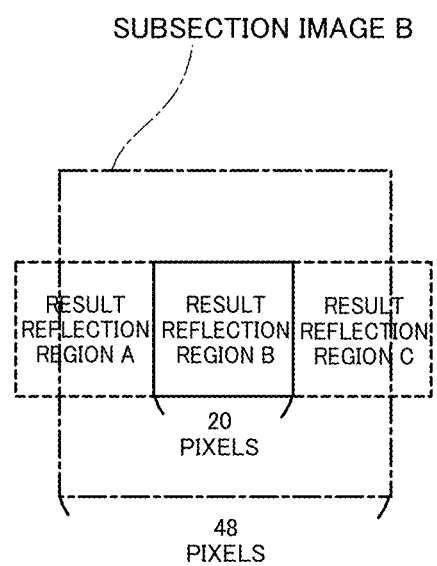

FIG. 12 is an explanatory diagram for explaining an example of setting a result reflection region and a subsection image. As an example, it is assumed that result reflection regions A, B, and C of the size of vertical 20 pixels× horizontal 20 pixels are set adjacent to one another. In this situation, it is assumed that subsection images A, B, and C respectively corresponding to the result reflection regions A, B, and C are extracted in the size of vertical 48 pixels× horizontal 48 pixels such that the result reflection region is positioned at the center. As illustrated in FIG. 12(a), it is seen that the subsection image A is extracted such that the result reflection region A is positioned at the center. As illustrated in FIG. 12(b), it is seen that the subsection image B corresponding to the adjacent result reflection region B is extracted in a form including a pixel region overlapping the subsection image A.

As described above, since one aspect of the second embodiment further includes a result reflection region setting unit that sets a result reflection region that is a region having a predetermined size equal to or less than a size of the subsection image, the result reflection region for reflecting a prediction result of the subsection image, in which the extraction unit extracts, as the subsection image, a region that includes the result reflection region and has a predetermined size equal to or greater than the result reflection region so as to correspond to each of the result reflection regions, and the prediction unit reflects the prediction result obtained for each subsection image into a corresponding result reflection region, the result reflection region reflecting the prediction result is set to a smaller size while setting a larger subsection image size so as to improve the correct answer rate of prediction for the processing of predicting the state of the subject's eye, and thus it is possible to obtain a result image with high resolution while maintaining prediction accuracy. That is, in a case of superimposing and displaying an image indicating a prediction result onto the ophthalmic image, a result display screen has low resolution if the prediction result based on the subsection image having a large size is superimposed and displayed in the size of the subsection image as it is. However, by reflecting the prediction result onto a result reflection region smaller than the subsection image as in the present example, it is possible to obtain a result image with high resolution while maintaining prediction accuracy.

Third Embodiment

Hereinafter, an example of an ophthalmic image processing system according to a third embodiment of the present invention will be described with reference to the drawings. Similarly to the cases of the first and second embodiments, the ophthalmic image processing system of the present invention can be achieved as a single ophthalmic image processing device that does not need to be connected to another device via a communication network, and thus will be described as an ophthalmic image processing device in the following description. Note that the same components as those of the first and second embodiments are denoted by the same reference signs, and description is sometimes omitted.

Figure 13:
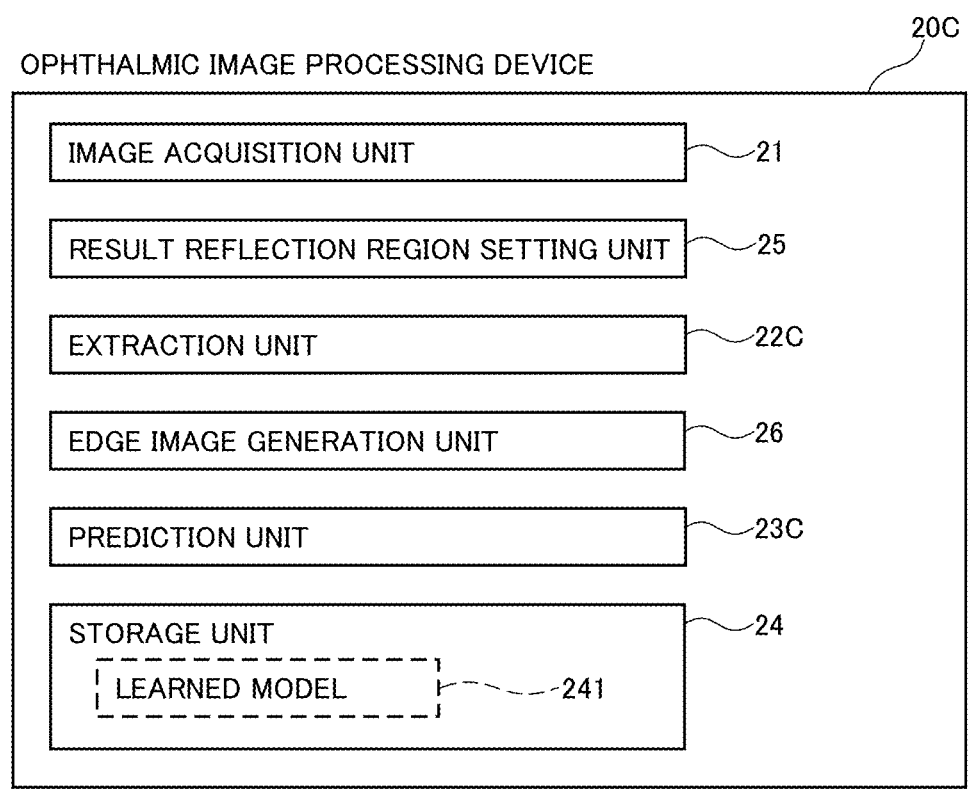
FIG. 13 is a block diagram that illustrates an example of a configuration of an ophthalmic image processing device corresponding to at least one of the embodiments of the present invention.

FIG. 13 is a block diagram that illustrates an example of the configuration of the ophthalmic image processing device corresponding to at least one of the embodiments of the present invention. As illustrated in FIG. 13, an ophthalmic image processing device 20C includes the image acquisition unit 21, the result reflection region setting unit 25, an extraction unit 22C, an edge image generation unit 26, a prediction unit 23C, and the storage unit 24.

The extraction unit 22C has a function of extracting, as the subsection image, a region that includes the result reflection region and has a predetermined size equal to or greater than the result reflection region so as to correspond to each of the result reflection regions.

The edge image generation unit 26 has a function of extracting an edge from an ophthalmic image and generating an edge image. Here, the edge image refers to an image in which a location having a large change in luminance value in the image is extracted as an edge. Since the edge image is an image indicating which location in an ophthalmic image an edge exists in, the edge image has the same size as that of the ophthalmic image in principle. The edge image is an image generated such that, for example, a location extracted as an edge has a high luminance value (the stronger the edge is, the higher the luminance value is) and a location that is not an edge has a low luminance value. In the present example, the edge image is used for streamlining the prediction processing on the premise that the location extracted as an edge is a place that is highly likely to be a target to be extracted as the state of a subject's eye. Any method may be used as long as the edge image can be generated, and for example, a known Sobel filter may be used in edge image generation. The generated edge image is stored in the storage unit 24.

The prediction unit 23C has a function of predicting the state of the subject's eye for each subsection image on the basis of a learned model in which learned has been performed in advance, has a function of setting a subsection image corresponding to the result reflection region as a target of prediction processing in a case where the luminance value in an edge image corresponding to the position of the result reflection region is equal to or greater than a predetermined threshold, and further has a function of reflecting the prediction result obtained for each subsection image into a corresponding result reflection region. That is, when the prediction processing is executed for all the result reflection regions set by the result reflection region setting unit 25, it takes a long processing time to complete the prediction processing for one ophthalmic image. The higher the resolution of an ophthalmic image is, the longer the processing time is. In order to shorten this processing time, it is judged that a location that does not include an edge image in a result determination region is highly likely not to include a target to be extracted as the state of the subject's eye, and the location is excluded from the target of prediction processing. That is, only the location including an edge image in the result determination region is set as the target of prediction processing. By performing this processing, it becomes possible to shorten the processing time required for the prediction processing.

Figure 14:
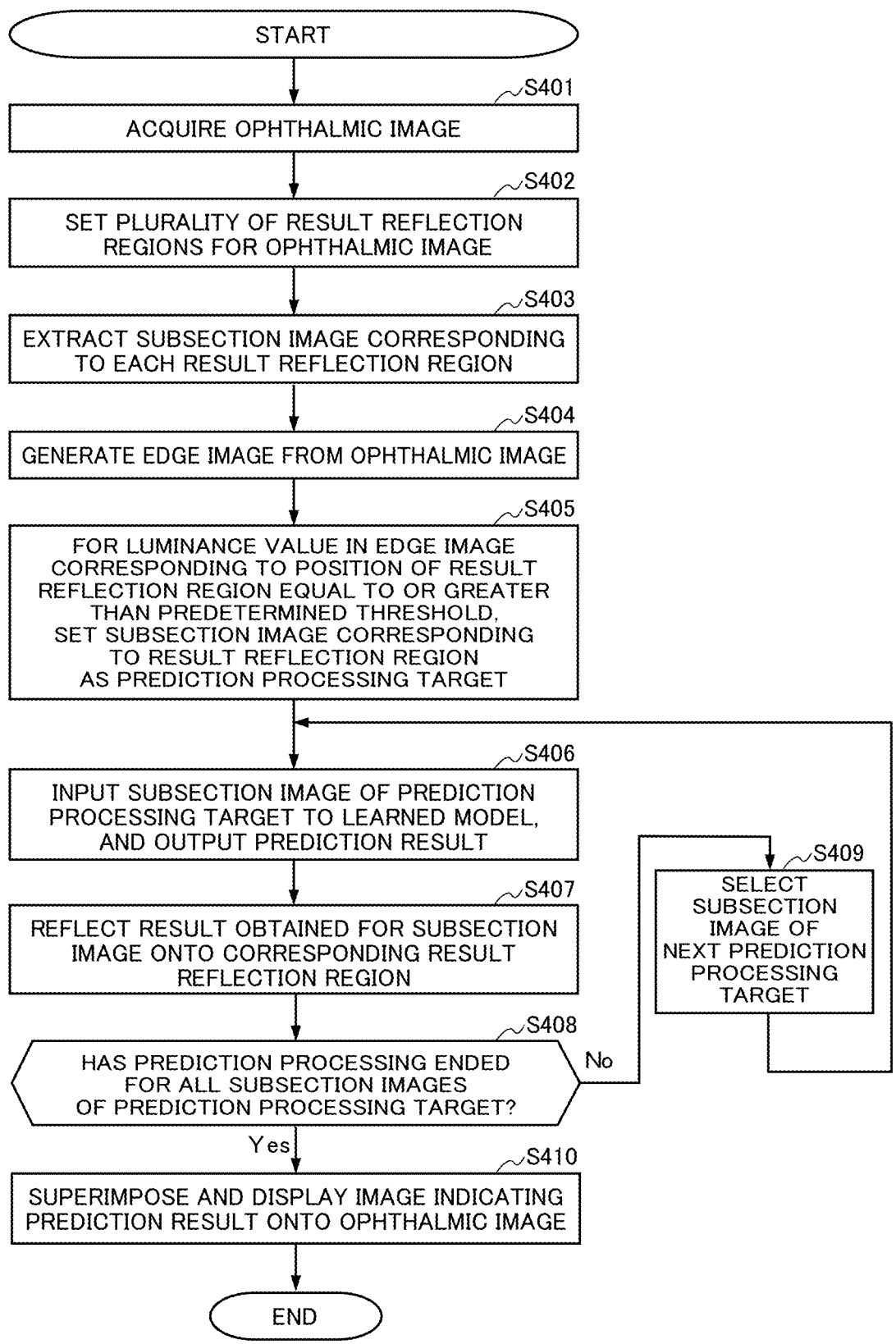
FIG. 14 is a flowchart that presents an example of a flow of prediction processing corresponding to at least one of the embodiments of the present invention.

Next, the flow of prediction processing corresponding to at least one of the embodiments of the present invention will be described. FIG. 14 is a flowchart that presents an example of the flow of the prediction processing corresponding to at least one of the embodiments of the present invention. In FIG. 14, the prediction processing is started when the ophthalmic image processing device 20C acquires an ophthalmic image for test (step S401). Next, the ophthalmic image processing device 20C sets a plurality of result reflection regions for the acquired ophthalmic image (step S402). The ophthalmic image processing device 20C extracts a subsection image corresponding to each result reflection region (step S403). Next, the ophthalmic image processing device 20C generates an edge image from an ophthalmic image (step S404). Then, for the luminance value in an edge image corresponding to the position of the result reflection region is equal to or greater than a predetermined threshold, the ophthalmic image processing device 20C sets a subsection image corresponding to the result reflection region as a target of prediction processing (step S405). Next, the ophthalmic image processing device 20C inputs a subsection image of the prediction processing target to a learned model for which learning has been performed in advance regarding predicting the state of the subject's eye, and causes the learned model to execute prediction processing to obtain the prediction result (step S406). The ophthalmic image processing device 20C reflects the prediction result obtained for the subsection image onto the corresponding result reflection region (step S407). Then, the ophthalmic image processing device 20C determines whether or not the prediction processing has ended for all the subsection images of prediction processing target (step S408). If the prediction processing has not ended for all the subsection images of prediction processing target (S408— No), the ophthalmic image processing device 20C selects the subsection image of the next prediction processing target (step S409), and returns to step S406. Thus, the prediction processing is sequentially executed for the subsection images of the target of prediction processing, and when the prediction processing is ended for all the subsection images of the target of prediction processing (S408—Yes), the ophthalmic image processing device 20C superimposes and displays an image indicating a prediction result onto the ophthalmic image (step S410), and ends the prediction processing.

As described above, since one aspect of the third embodiment further includes an edge image generation unit that extracts an edge from an ophthalmic image and generating an edge image, and in a case where the luminance value in an edge image corresponding to the position of the result reflection region is equal to or greater than a predetermined threshold, the prediction unit sets a subsection image corresponding to the result reflection region as a target of prediction processing, it is possible to extract only a result reflection region including an edge having equal to or greater than a predetermined luminance value, which is highly likely to include a target to be extracted as a state of a subject's eye, and to set only a subsection image corresponding to the extracted result reflection region as a target of prediction processing, and therefore, it becomes possible to shorten a processing time required for the prediction processing.

Fourth Embodiment

In addition to the configurations of the first to third embodiments, the prediction unit 23 may calculate a mean luminance value for each of the subsection images and set a subsection image having a mean luminance value equal to or greater than a predetermined threshold as a target of prediction processing.

It is said that a location unnecessary for prediction of the state of the subject's eye, such as a location outside the field of view in the ophthalmic image or a location of eyelash, is black (dark) and has a very low luminance value. Since it is obvious that such location does not include a target to be extracted as the state of the subject's eye, if such location can be excluded from the target of prediction processing, the processing time required for the prediction processing can be shortened. Therefore, the prediction unit 23 calculates a mean luminance value for each subsection image, and sets a subsection image having a mean luminance value equal to or greater than a predetermined threshold as a target of prediction processing, and excludes a subsection image having a mean luminance value less than the predetermined threshold from the target of prediction processing, so that the processing time required for the prediction processing can be shortened.

Note that, by setting a subsection image having a mean luminance value of this fourth embodiment less than a predetermined threshold to be excluded from the target of prediction processing, a location outside the field of view, a location of the eyelash, and the like are removed, and furthermore, by causing learning to predict that the eyelashes, the contours, and the like are excluded from the target of extraction at the stage of learning with respect to the learned model, it becomes possible to determine (predict to classify into "excluded from target" or "others") that the subsection image mainly including an eyelash and a contour that exists in the subsection image having a mean luminance value equal to or greater than the predetermined threshold is excluded from the target also at the time of prediction processing by the prediction unit 23. Thus, by removing and excluding, from the target, unnecessary locations such as a location outside the field of view and a location of eyelashes by the two means, it is possible to further expect an increase in prediction speed and improvement in prediction accuracy.

Fifth Embodiment

In addition to the configurations of the first to third embodiments, the edge image generation unit may generate an edge image from an ophthalmic image, and decide whether or not to set a subsection image as a target of prediction processing using the edge image.

According to the present invention, by subsectioning an ophthalmic image that is a target of prediction processing, it is possible to specify and display the position of the structure of interest in the image, but this requires inference on many subsection images, and thus there is a problem that analysis time is long. On the other hand, there are many generated subsection images that do not require inference, and if they can be excluded from the inference target in advance, it can be expected that the inference time will be significantly shortened. In many cases, the structure of interest in the image has a clear contour or has a dense complex structure, and therefore, if such a location can be extracted by any method, it can be judged whether or not an arbitrary subsection image is a target to be inferred.

Therefore, an edge image is generated from an ophthalmic image by adopting a configuration similar to that of the edge image generation unit 26 described in the third embodiment. Then, the prediction unit 23 determines whether or not the edge image corresponding to the position of each subsection image includes an edge location. Specifically, it decides whether or not to set it as the target of prediction processing depending on the intensity of the luminance of the edge image corresponding to the position of the subsection image. Various conditions such as a mean value, a maximum value, a median value, and a standard deviation of luminance values can be set for the intensity of the luminance of the edge image. Thus, since in a case where a subsection image includes an edge, it is estimated to be a subsection image in which a structure of interest exists in the image, the prediction processing is executed, and in a case where the subsection image does not include an edge, the subsection image is set not to be the target of the prediction processing, the number of times of inference requiring time can be greatly reduced, and therefore the analysis time can be shortened.

Note that, by setting a subsection image that does not include an edge by the configuration of this fifth embodiment to be excluded from the target of prediction processing, a location outside the field of view, a location of the eyelash, and the like are removed, and furthermore, by causing learning to predict that the eyelashes, the contours, and the like are excluded from the target of extraction at the stage of learning with respect to the learned model, it becomes possible to determine (predict to classify into "excluded from target" or "others") that the subsection image mainly including an eyelash and a contour that exists in the subsection image including the edge is excluded from the target of prediction processing also at the time of prediction processing by the prediction unit 23. Thus, by removing and excluding, from the target, unnecessary locations such as a location outside the field of view and a location of eyelashes by the two means, it is possible to further expect an increase in prediction speed and improvement in prediction accuracy.

Sixth Embodiment

In the first to fifth embodiments, the case of executing prediction processing on one ophthalmic image has been described, but the present invention is not limited to this. That is, the image acquisition unit 21 may acquire a plurality of ophthalmic images arranged in time series, the prediction unit 23 may execute prediction processing for each of the plurality of ophthalmic images, and a change determination unit may be further provided to determine whether or not a temporal change and/or a spatial change in the state of a subject's eye satisfies a predetermined condition for a prediction result obtained for each of the plurality of ophthalmic images.

In a case of evaluating the state of a subject's eye, there is information obtained by evaluating one ophthalmic image, but there is also information obtained by considering a temporal change and a spatial change in prediction results for a plurality of ophthalmic images arranged in time series. For example, examples of the temporal change include evaluation of the possibility of a specific disease by evaluating how long in elapse of time after blinking the state of the subject's eye is detected. In this case, it is conceivable to calculate the state of the subject's eye of the target and the number of the predicted subsection images for each ophthalmic image and the ratio of the state of the subject's eye of the target in the entire ophthalmic image, and evaluate how much temporal change the number and ratio of the state of the subject's eye of the target exceed the predetermined threshold with when the temporal change is followed. It is conceivable to detect that the gradient of the temporal change of the ratio of the state of the subject's eye is equal to or greater than a predetermined condition. Examples of the spatial change include evaluation as to how the location where the state of the subject's eye to be a target is detected moves.

Thus, by determining whether or not a temporal change and/or a spatial change in the state of a subject's eye satisfies a predetermined condition, it becomes possible to evaluate information that cannot be evaluated only by the prediction result for a single ophthalmic image.

Seventh Embodiment

Hereinafter, an example of an ophthalmic image processing system according to a seventh embodiment of the present invention will be described with reference to the drawings. As described later, the ophthalmic image processing system of the present invention can be achieved as a single ophthalmic image processing device that does not need to be connected to another device via a communication network, and thus is not necessarily required to be an ophthalmic image processing system. The following description will be given on the premise that there is a case where the ophthalmic image processing system of the present invention functions as an ophthalmic image processing system.

Figure 15:
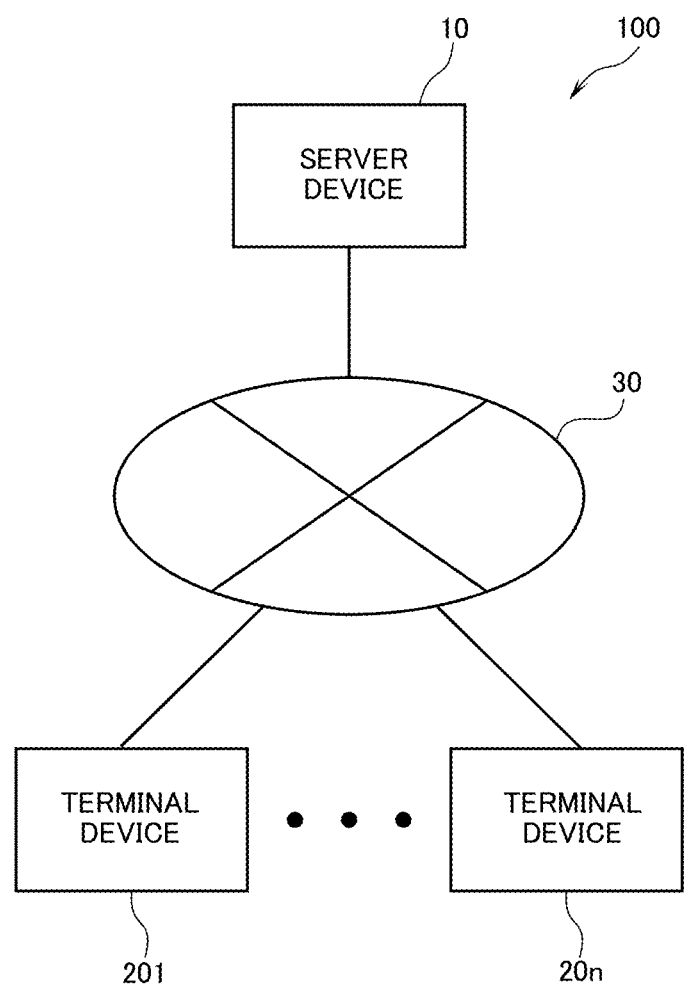
FIG. 15 is a block diagram that illustrates an example of a configuration of an ophthalmic image processing system corresponding to at least one of the embodiments of the present invention.

FIG. 15 is a block diagram that illustrates an example of the configuration of the ophthalmic image processing system corresponding to at least one of the embodiments of the present invention. As illustrated in FIG. 15, the ophthalmic image processing system 100 is configured such that the server device 10 and the terminal devices 201 to 20n (hereinafter, they are sometimes expressed as terminal device 20) can be connected to one another via the communication network 30. For example, the server device 10 in FIG. 15 may function as an ophthalmic image processing device, and the server device 10 functioning as an ophthalmic image processing device may be connected for use from any of the plurality of terminal devices 201 to 20n via the communication network. At this time, a program for using the ophthalmic image processing device may be installed in the terminal device 20, or a program on the server may be used via a browser.

An identical device does not need to include all the constituent elements of the ophthalmic image processing device described below. Some components may be included in another device, for example, some components may be included in the server device 10 and any of the plurality of terminal devices 201 to 20n that can be connected via the communication network, and in this manner, a configuration included in another device may be used while the ophthalmic image processing device performs communication. Not only one server device 10 but also a plurality of server devices may be used. A learned model described later may be distributed in the server device 10, the plurality of terminal devices 201 to 20n, and the like as other devices in addition to being stored in the device as an ophthalmic image processing device, and may be connected via the communication network each time for use to the device including the learned model to be used. That is, as long as a learned model stored by any storage means is available, it does not matter whether a learned model storage means is included in the ophthalmic image processing device itself or another device.

Figure 16:
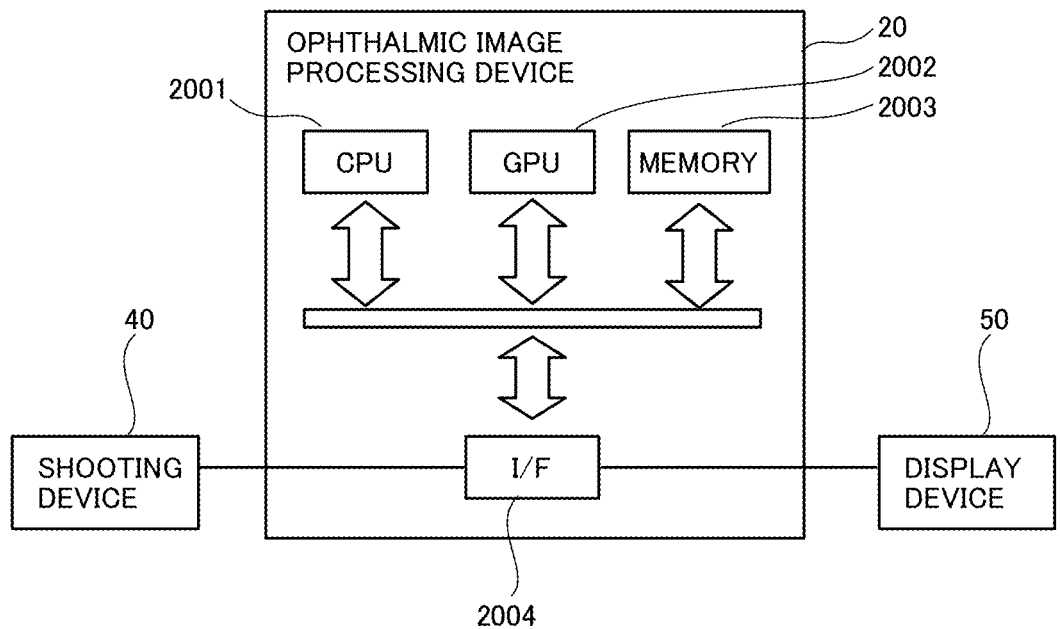
FIG. 16 is a block diagram that illustrates an example of a configuration of an ophthalmic image processing device and a peripheral device corresponding to at least one of the embodiments of the present invention.

FIG. 16 is a block diagram that illustrates an example of the configuration of the ophthalmic image processing device and the peripheral device corresponding to at least one of the embodiments of the present invention. Note that, in the following description, in order to describe a case where the terminal device 20 functions as an ophthalmic image processing device as an example, the description will be given with the same reference sign as that of the terminal device such as the ophthalmic image processing device 20, but the present invention is not limited to this.

An ophthalmic image processing device 20 may be a device designed as a dedicated machine, but can be implemented by a general computer. That is, as illustrated in FIG. 16, the ophthalmic image processing device 20 includes at least the central processing unit (CPU) 2001 and the memory 2003, which are likely to be normally included in a general computer, and further includes the graphics processing unit (GPU) 2002. The ophthalmic image processing device 20 is connected to each of a shooting device 40 and a display device 50 via an interface (I/F) 2003. An input device such as a mouse and a keyboard, an output device such as a printer, and a communication device for connecting to a communication network may be connected via a bus. Processing in each unit of the ophthalmic image processing device 20 is carried out by reading a program for executing the processing in each unit from the memory and executing the program in a CPU or a GPU that functions as a control circuit (processing circuit or processing circuitry). In other words, by executing the program, the processor (processing circuit) can execute each processing of each device. The shooting device 40 is used to shoot an ophthalmic image, and the display device 50 is used to display an image indicating a prediction result superimposed on the ophthalmic image, for example. Note that for the ophthalmic image processing device 20, any apparatus can be adopted as long as it can execute processing equivalent to that of a computer, and can be implemented by, for example, a smartphone, a tablet terminal, and the like.

Figure 17:
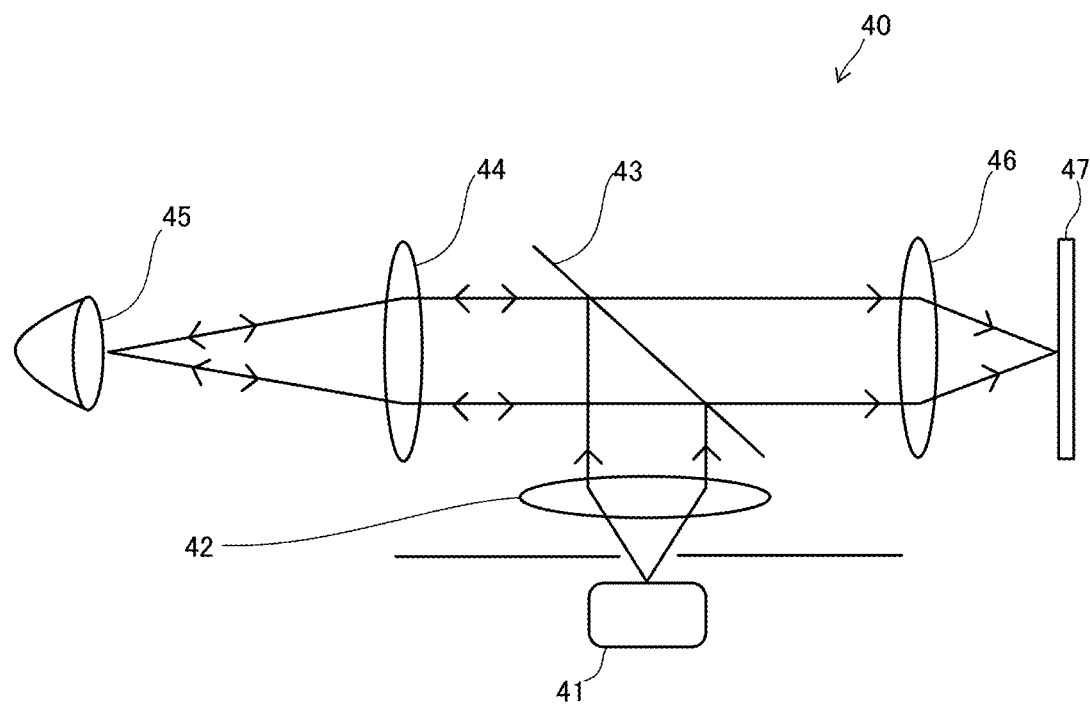
FIG. 17 is an explanatory diagram that illustrates an example of a configuration of a shooting device corresponding to at least one of the embodiments of the present invention.

FIG. 17 is an explanatory diagram that illustrates an example of the configuration of the shooting device corresponding to at least one of the embodiments of the present invention. The shooting device 40 is only required to be able to record, as digital data, an image on which a subject's eye of a shooting target appears, and a conventionally known device may be appropriately used, but, for example, as schematically illustrated in FIG. 17, in the shooting device 40, a light beam emitted from a light source 41 including a white LED passes through a diaphragm and is condensed on an anterior eye part 45 of the subject's eye through a lens 42, a splitter 43, and an objective lens 44 in this order. The reflected light from the anterior eye part 45 passes through the objective lens 44 and the splitter 43, and is imaged on an imaging element 47 via an imaging lens 46. The shooting data imaged on the imaging element 47 is subjected to predetermined processing by an image processing engine, and is converted into image data and moving image data. An ophthalmic image shot by this shooting device 40 is transmitted to the ophthalmic image processing device 20. In the following description, there is a case where the expression "image" appears as in ophthalmic image and subsection image, but it is assumed that that expression includes not only the content indicated by "image" but also data of the image.

Figure 18A:
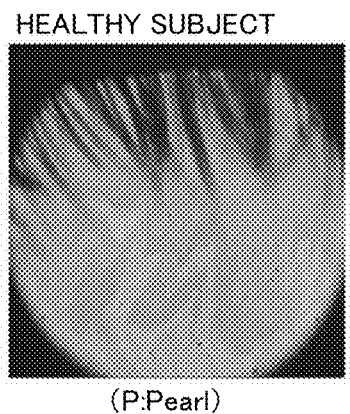
FIG. 18 is an explanatory diagram that expresses a state of dry eye of a subject's eye as an evaluation target in an ophthalmic image processing device corresponding to at least one of the embodiments of the present invention.
Figure 18B:
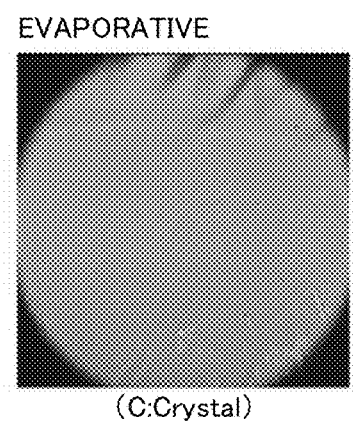
Figure 18C:
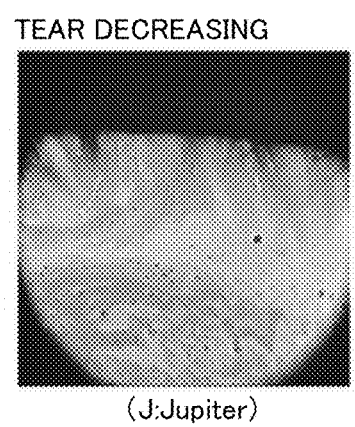

FIG. 18 is an explanatory diagram that expresses the state of dry eye of a subject's eye as an evaluation target in the ophthalmic image processing device corresponding to at least one of the embodiments of the present invention. As illustrated in FIG. 18, the ophthalmic image processing device of the present invention is configured to be able to predict, as a state of dry eye of the subject's eye, at least three states of (a) a state of healthy subject (a state free-from dry eye), (b) a state of evaporative dry eye, and (c) a state of tear decreasing dry eye. Here, (a) the state of healthy subject is a healthy state in which the lipid layer and the liquid layer of tear are maintained in a well-balanced manner, and has a feature that slightly dark gray interference fringes with low saturation are observed. (b) The state of evaporative dry eye is a state in which tear evaporation is enhanced, and has a feature that a dark and smooth state is observed. (c) The state of tear decreasing dry eye is a state in which the secreted tear amount decreases, and has a feature that highly saturated interference fringes are observed. Note that (a) the state of healthy subject can also be expressed as Pearl (P) type because it looks like a pearl, (b) the state of evaporative dry eye can also be expressed as Crystal (C) type because it looks like crystal, and (c) the state of tear decreasing dry eye can also be expressed as Jupiter (J) type because it looks like Jupiter.

Figure 19:
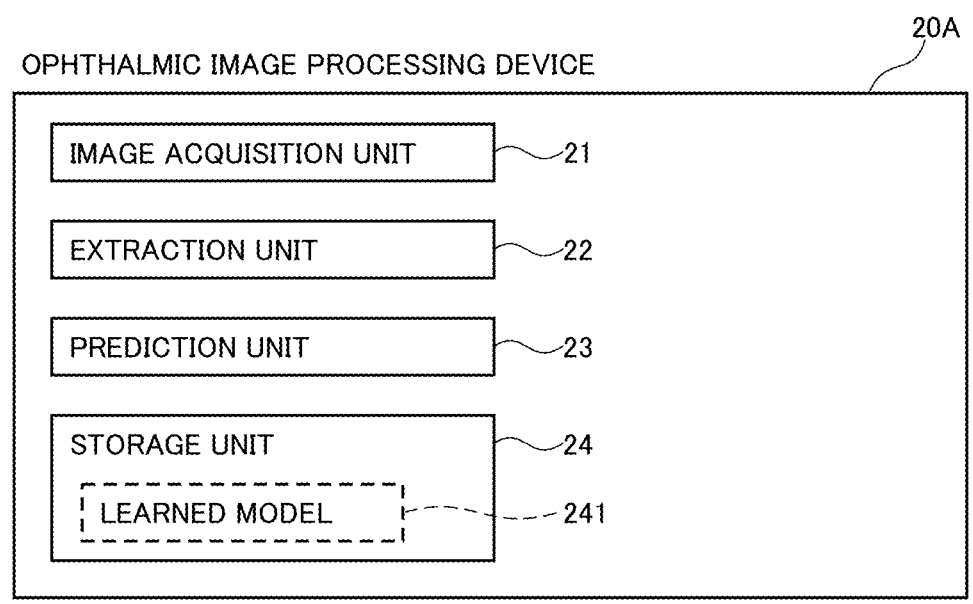
FIG. 19 is a block diagram that illustrates an example of a configuration of an ophthalmic image processing device corresponding to at least one of the embodiments of the present invention.

The configuration of the ophthalmic image processing device 20 will be described as the ophthalmic image processing device 20A in the seventh embodiment in FIG. 19. FIG. 19 is a block diagram that illustrates an example of the configuration of the ophthalmic image processing device corresponding to at least one of the embodiments of the present invention. As illustrated in FIG. 19, the ophthalmic image processing device 20A includes the image acquisition unit 21, the extraction unit 22, the prediction unit 23, and the storage unit 24.

The image acquisition unit 21 has a function of acquiring an ophthalmic image. Here, the ophthalmic image refers to an image obtained by shooting a target subject's eye. The ophthalmic image is shot with a shooting target area and a shooting technique that can evaluate the state of dry eye of the subject's eye of the evaluation target. The state of dry eye of the subject's eye refers to a specific state that can be used for evaluation of dry eye of the subject's eye, and specifically includes at least three states of (a) the state of healthy subject (a state free-from dry eye), (b) the state of evaporative dry eye, and (c) the state of tear decreasing dry eye. This image acquisition unit 21 acquires the ophthalmic image shot by the shooting device 40.

The extraction unit 22 has a function of extracting a plurality of subsection images from an ophthalmic image. Here, the subsection image is an image including a region having a size smaller than that of the ophthalmic image, and refers to an image having a size serving as a unit for performing prediction processing described later. The size of the subsection image is not necessarily a fixed size and can be set as appropriate, but both extreme sizes have a problem, i.e., an extremely small size makes it impossible to detect the state of dry eye of the target subject's eye, and an extremely large size causes an image including many locations other than the state location of dry eye of the target subject's eye to be detected as a corresponding image, and therefore, it is preferable to set the size to a size that allows the state of dry eye of the target subject's eye to be appropriately detected.

The prediction unit 23 has a function of predicting the state of dry eye of the subject's eye for each subsection image on the basis of a learned model in which learned has been performed in advance. The learning processing of the learned model is performed by extracting a plurality of subsection images from an ophthalmic image for learning and by predicting the state of dry eye of the subject's eye for each subsection image by machine learning using correct answer data related to the state of each subsection image. As the learned model, various models can be applied as long as learning is performed by machine learning, and for example, learning of a neural network by deep learning is applicable. Furthermore, as an example, it is also possible to adopt a convolutional neural network (CNN). The sizes of the subsection image used for learning and the subsection image for test extracted by the extraction unit 22 need to be the same size. This prediction unit 23 input, into the learned model, the subsection image for test extracted by the extraction unit 22, predicts whether or not it has a feature corresponding to the state of dry eye of the subject's eye, and outputs a prediction result. Note that details of the learning processing will be described later.

The storage unit 24 has a function of storing information necessary for processing of each unit in the ophthalmic image processing device 20A and also storing various types of information generated by the processing of each unit. This storage unit 24 may store a learned model 241. Note that the learned model may be stored in the server device 10 connectable via the communication network, and the server device 10 may have the function of the prediction unit 23.

Figure 20:
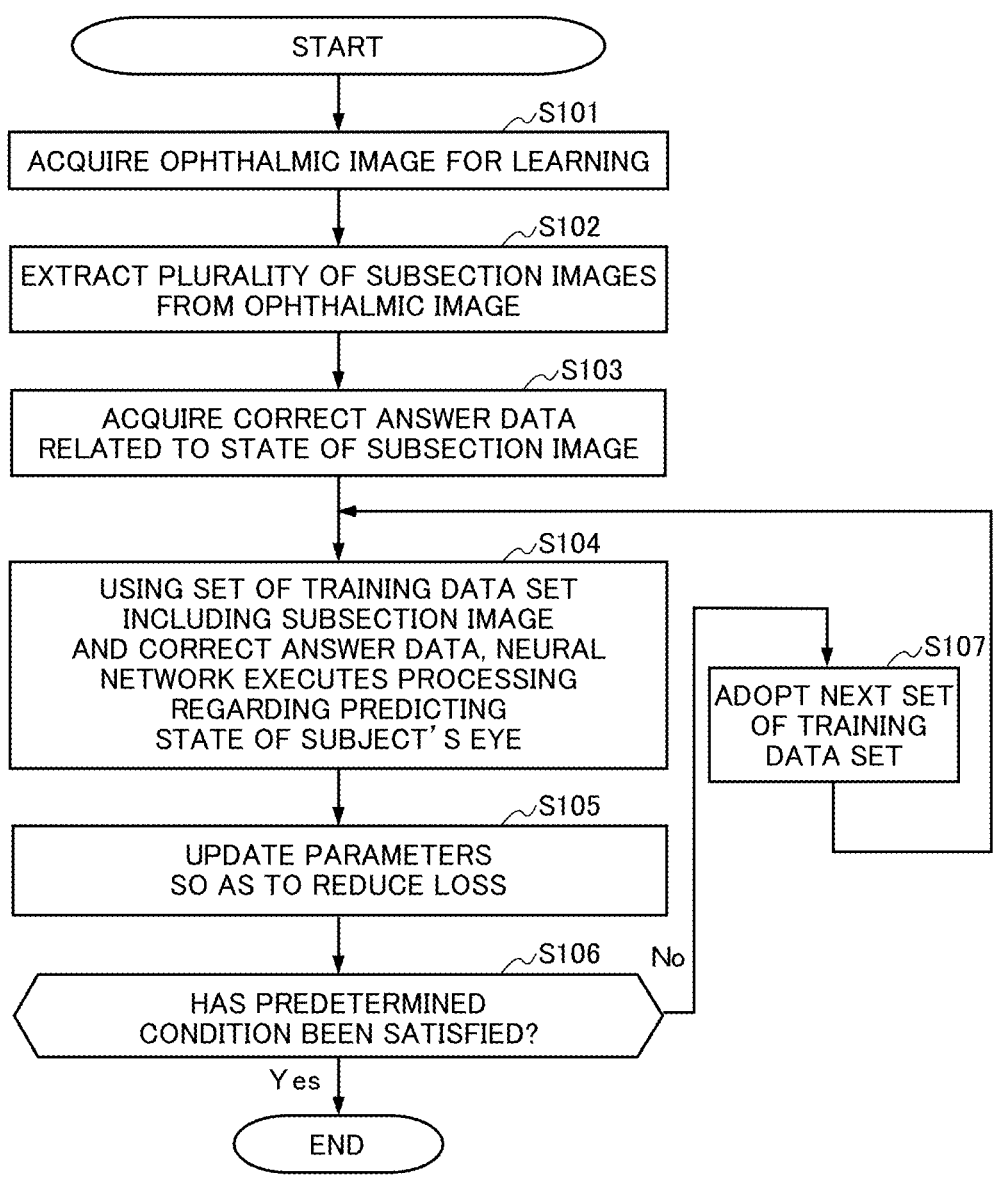
FIG. 20 is a flowchart that presents an example of a flow of learning processing corresponding to at least one of the embodiments of the present invention.

Next, the flow of learning processing corresponding to at least one of the embodiments of the present invention will be described. FIG. 20 is a flowchart that presents an example of the flow of the learning processing corresponding to at least one of the embodiments of the present invention. In FIG. 20, the learning processing is started when the ophthalmic image processing device 20A acquires an ophthalmic image for learning (step S101). It is preferable that a plurality of ophthalmic images be acquired. Next, the ophthalmic image processing device 20A extracts a plurality of subsection images from the acquired ophthalmic image (step S102). The ophthalmic image processing device 20A acquires correct answer data for each subsection image (step S103). The thus acquired subsection image and its correct answer data are stored as a set of training data set. Learning is performed using a plurality of sets of such training data sets. Next, using a set of training data set including a subsection image and its correct answer data, the ophthalmic image processing device 20A causes the neural network to execute processing of predicting the state of dry eye of the subject's eye based on the input subsection image, and obtains a prediction result (step S104). Furthermore, the ophthalmic image processing device 20A obtains a loss by calculation on the basis of a loss function using the prediction result obtained by the prediction processing and the correct answer data, and updates parameters (weight, bias, and the like) of the neural network so as to reduce the loss (step S105). Then, the ophthalmic image processing device 20A determines whether or not a predetermined condition has been satisfied (step S106). The predetermined conditions here include that the number of times of trial of processing of updating parameters of the neural network has reached a predetermined number of times, and that a situation in which the value of the loss of the loss function has turned to increase after recording the minimum value is observed. If the predetermined condition has not been satisfied (S106—No), the ophthalmic image processing device 20A selects a next set of training data set (step S107), then returns to step S104, and executes the processing of S104 and S105 using the next training data set. Thus, the ophthalmic image processing device 20A repeats the processing of S104 and S105 while changing the training data set until the predetermined condition is satisfied, and ends the learning processing when the predetermined condition is satisfied (S106—Yes).

Note that how to use a plurality of sets of training data sets prepared in advance for learning can be appropriately set. For example, a plurality of sets of training data sets may be divided into a plurality of groups of a predetermined batch size, and mini-batch learning may be performed in which processing for each group serves as a boundary of one learning. When all the training data sets are used only once by performing the learning processing for all the groups in the mini-batch learning, but the learning may be set to be performed using a set of training data set a plurality of times (the number set as the number of epochs) by setting the number of epochs to a predetermined size. In addition to the case of learning the neural network from zero, transfer learning for which a learned model used for image recognition other than an ophthalmic image is diverted may be performed.

Figure 21:
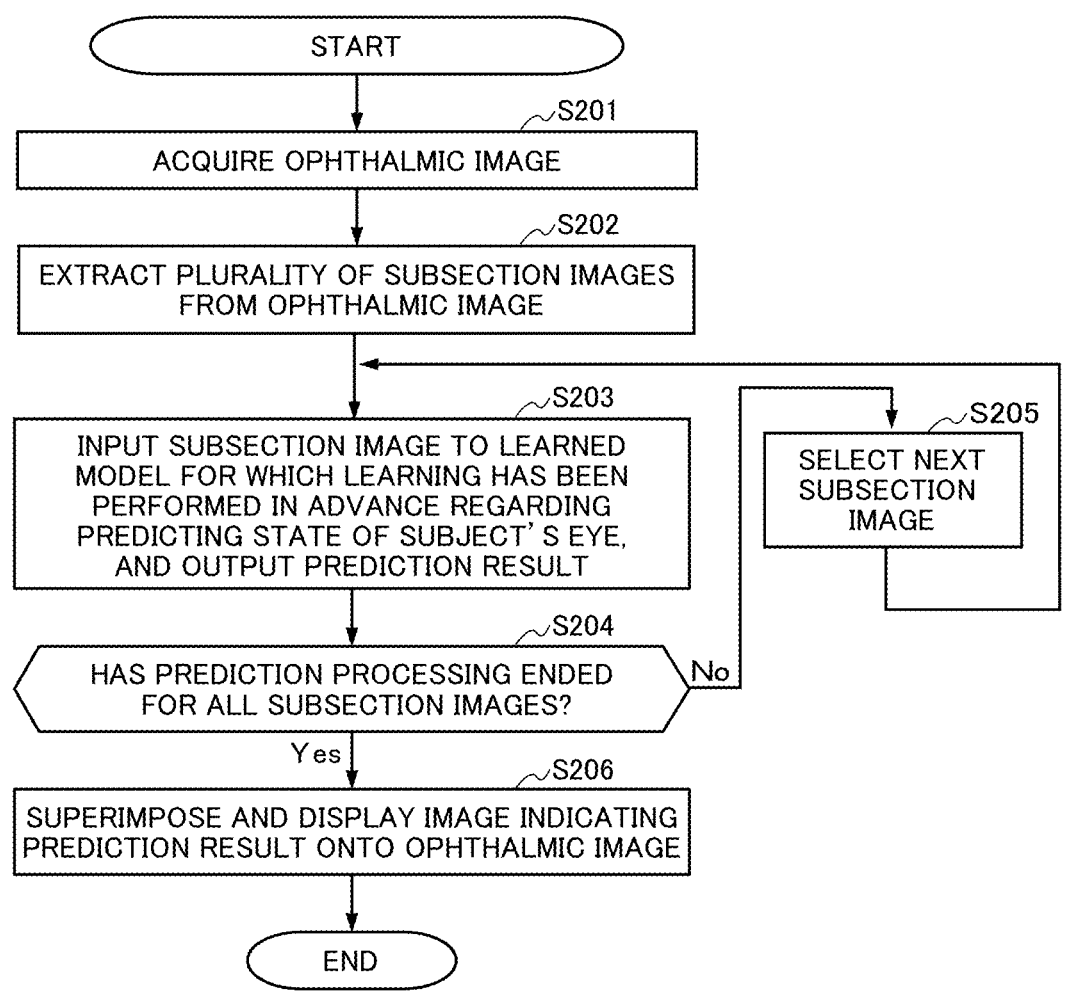
FIG. 21 is a flowchart that presents an example of a flow of prediction processing corresponding to at least one of the embodiments of the present invention.

Next, the flow of prediction processing corresponding to at least one of the embodiments of the present invention will be described. FIG. 21 is a flowchart that presents an example of the flow of the prediction processing corresponding to at least one of the embodiments of the present invention. In FIG. 21, the prediction processing is started when the ophthalmic image processing device 20A acquires an ophthalmic image for test (step S201). Next, the ophthalmic image processing device 20A extracts a plurality of subsection images from the acquired ophthalmic image (step S202). Next, the ophthalmic image processing device 20A inputs the subsection image to the learned model for which learning has been performed in advance regarding predicting the state of dry eye of the subject's eye, executes the prediction processing, and obtains the prediction result (step S203). Then, the ophthalmic image processing device 20A determines whether or not the prediction processing has ended for all the subsection images (step S204). If the prediction processing has not ended for all the subsection images (S204—No), the ophthalmic image processing device 20A selects the next subsection image (step S205), and then returns to step S203. Thus, the prediction processing is sequentially executed for the subsection images, and when the prediction processing is ended for all the subsection images (S204—Yes), the ophthalmic image processing device 20A superimposes and displays an image indicating a prediction result onto the ophthalmic image (step S206), and ends the prediction processing.

Figure 22A:
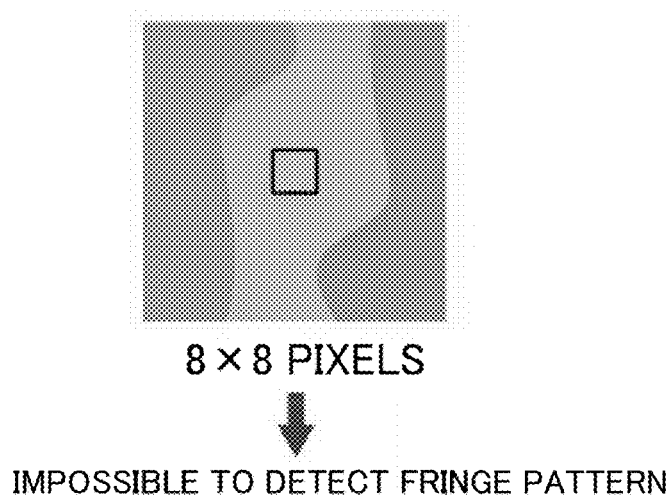
FIG. 22 is an explanatory diagram for explaining a relationship between a size of a subsection image and whether to be able to detect a fringe pattern.
Figure 22B:
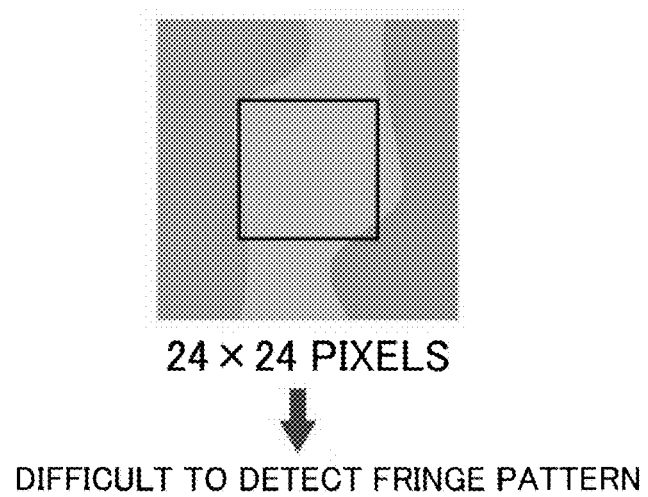
Figure 22C:
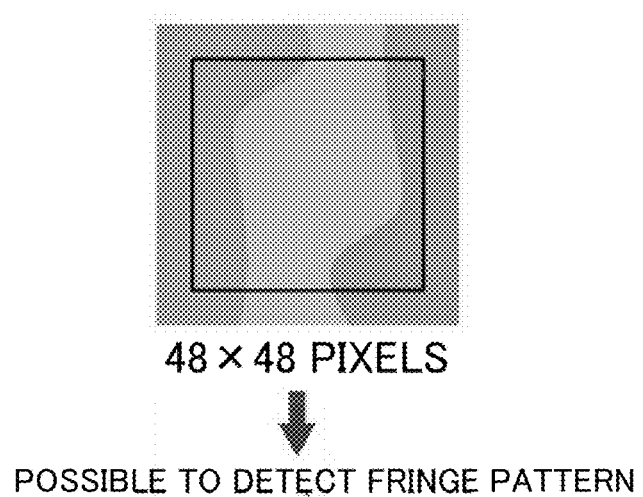

FIG. 22 is an explanatory diagram for explaining a relationship between the size of a subsection image and whether to be able to detect a fringe pattern. Although the size of the subsection image can be set to various sizes, it is preferable to be a size that enables accurate detection of the state of dry eye of the target subject's eye. Therefore, by confirming the detection accuracy while variously changing the size of the subsection image, verification was performed on the optimal size of the subsection image. FIG. 22(a) illustrates a case where the size of the subsection image was set to horizontal 8 pixels×vertical 8 pixels, and the prediction accuracy was low in the case of this size of 8 pixels×8 pixels. That is, it has not been able to detect the fringe pattern of the tear interference fringe and the like. As illustrated in FIG. 22(a), this state is presumed to be because the size of the subsection image is too small compared to the size of the fringe pattern to extract the characteristics of the state of dry eye including the fringe pattern. Next, FIG. 22(b) illustrates a case where the size of the subsection image was set to horizontal 24 pixels×vertical 24 pixels. In the case of this size of 24 pixels×24 pixels, the prediction accuracy has been improved as compared with the case of the size of 8 pixels×8 pixels in FIG. 22(a) but the prediction accuracy cannot be said to be sufficient. As illustrated in FIG. 22(b), this state is presumed to have a size in which there is a possibility that the boundary location of the fringe pattern cannot be exactly detected due to arrangement of the subsection images, and thus there is a case where it cannot be predicted as a fringe pattern, resulting in prediction accuracy that is not sufficiently improved. FIG. 22(c) illustrates a case where the size of the subsection image was set to horizontal 48 pixels×vertical 48 pixels, and good prediction accuracy was obtained in the case of this size of 48 pixels×48 pixels. As illustrated in FIG. 22(c), this state is presumed to have set the size of the subsection image having a sufficient size with respect to the size of the fringe pattern, so that the state of dry eye including a fringe pattern is hardly undetected. In view of this, in the present invention in which it is necessary to detect a fringe pattern as a state of dry eye of a subject's eye, it is not preferable to set the size of the subsection image to be too small, and it is preferable to set the size of the subsection image to be able to obtain desired prediction accuracy in balance with the prediction accuracy.

Not limited to the example of FIG. 22, in a case where the size of the subsection image is decided on the basis of the prediction accuracy in predicting the state of dry eye of the subject's eye, a decision method is conceivable in which the relationship between the size of the subsection image and the correct answer rate of prediction is calculated in advance and the size is set to a size that becomes equal to or greater than a predetermined correct answer rate. On the basis of a viewpoint as to what size to observe the state of dry eye of the subject's eye on an actual ocular surface makes it possible to accurately detect the target state, a decision method of setting the size of the subsection image on the basis of the actual size occupied in the surface area of the ocular is conceivable.

Figure 23A:
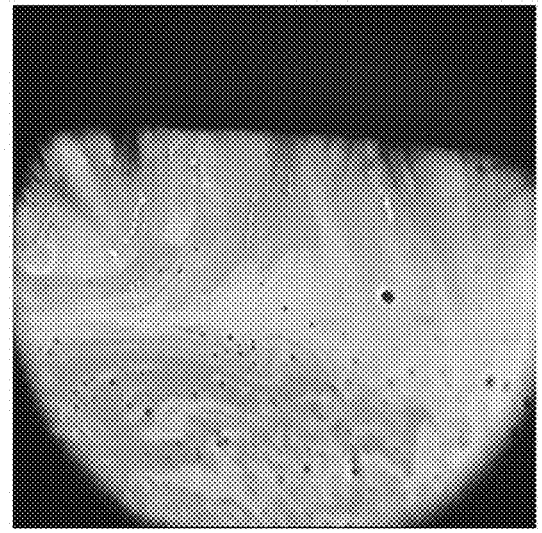
FIG. 23 is an explanatory diagram that expresses an example of an ophthalmic image before prediction processing and an ophthalmic image on which a prediction processing result is superimposed and displayed.
Figure 23B:
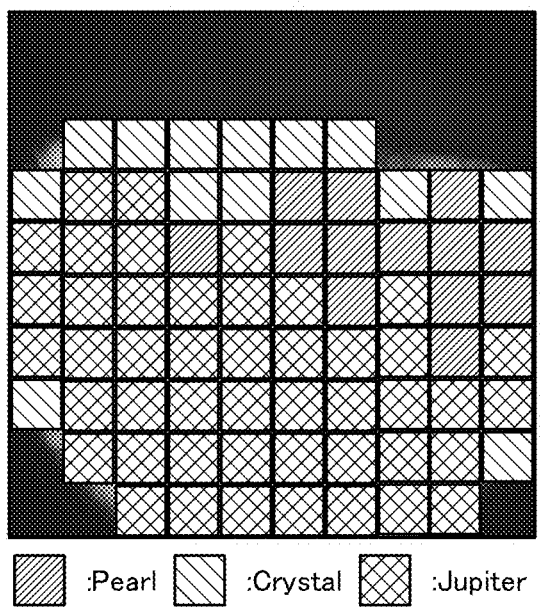

FIG. 23 is an explanatory diagram that expresses an example of an ophthalmic image before prediction processing and an ophthalmic image on which a prediction processing result is superimposed and displayed. FIG. 23(a) expresses an ophthalmic image including a state of tear decreasing dry eye as an ophthalmic image of the prediction processing target, and FIG. 23(b) illustrates an ophthalmic image on which an image indicating a prediction result is superimposed and displayed. As illustrated in FIGS. 23(a) and (b), it is seen that the prediction can be performed with high accuracy because there are many locations of Jupiter indicating a region predicted as the state of tear decreasing dry eye. Although there are many locations of Jupiter as a whole, it is seen that, in individual subsection images, there are also locations of Pearl, which indicates a region predicted as a state of healthy subject and locations of Crystal, which indicates a region predicted as a state of evaporative dry eye.

As described above, since one aspect of the seventh embodiment includes: an image acquisition unit that acquires the ophthalmic image of an evaluation target; an extraction unit that extracts a plurality of subsection images from the ophthalmic image; and a prediction unit that predicts a state of dry eye of a subject's eye for each subsection image based on a learned model in which learning has been performed in advance regarding extracting a plurality of subsection images from an ophthalmic image for learning, and, using correct answer data related to a state of each subsection image, predicting, for each subsection image by machine learning, which of at least a healthy state, a state of tear decreasing dry eye, and a state of evaporative dry eye a state of dry eye of a subject's eye corresponds to, in which the subsection image is extracted from the ophthalmic image so as to have an image size corresponding to a state of a subject's eye of an evaluation target, a state of dry eye of a subject's eye can be highly accurately predicted, and a prediction result for each subsection image is obtained, and therefore a state of dry eye of a subject's eye can be analyzed in detail.

That is, as in the present example, a configuration of extracting a plurality of subsection images from an ophthalmic image and executing prediction processing for each subsection image gives advantages such as [1] it is possible to accurately extract, with high sensitivity, even an extraction target that exists only in a small part of an image, [2] it is possible to indicate as to which site of the image to have a structure of the extraction target, and thus the ability of diagnosis support is high, [3] since one image is divided into subsections to obtain a large number of subsection images, it is easy to collect a large number of samples for improving the prediction accuracy, and [4] it is possible to construct a model that is high in robustness against noise by learning that eyelashes, contours, and the like are not extraction targets.

Eighth Embodiment

Hereinafter, an example of an ophthalmic image processing system according to an eighth embodiment of the present invention will be described with reference to the drawings. Similarly to the case of the seventh embodiment, the ophthalmic image processing system of the present invention can be achieved as a single ophthalmic image processing device that does not need to be connected to another device via a communication network, and thus will be described as an ophthalmic image processing device in the following description. Note that the same components as those of the seventh embodiment are denoted by the same reference signs, and description is sometimes omitted.

Figure 24:
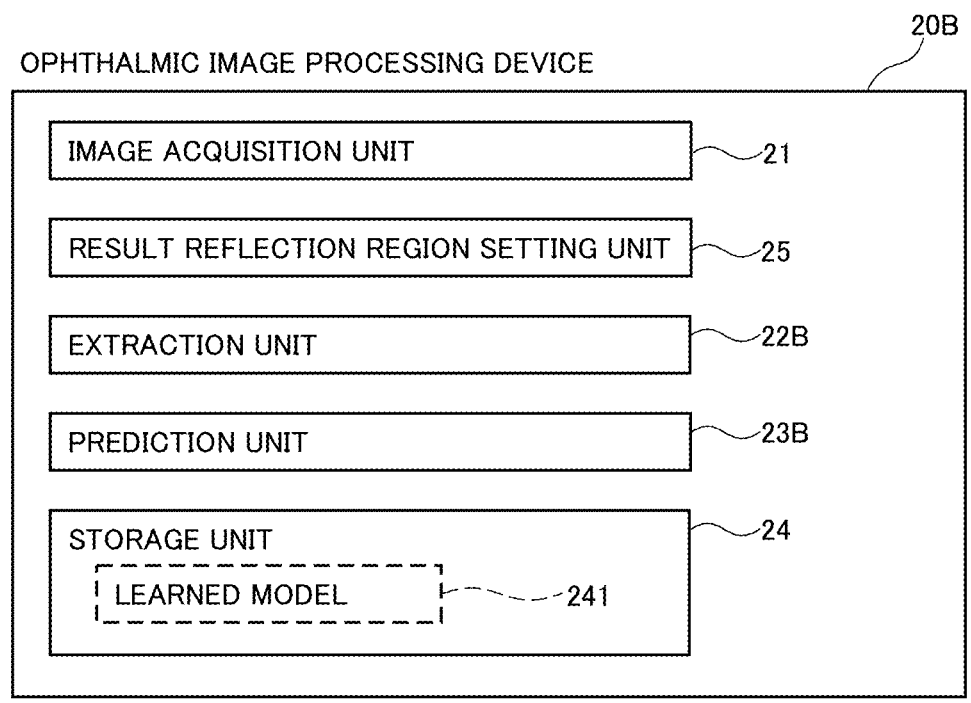
FIG. 24 is a block diagram that illustrates an example of a configuration of an ophthalmic image processing device corresponding to at least one of the embodiments of the present invention.

FIG. 24 is a block diagram that illustrates an example of the configuration of the ophthalmic image processing device corresponding to at least one of the embodiments of the present invention. As illustrated in FIG. 24, the ophthalmic image processing device 20B includes the image acquisition unit 21, the result reflection region setting unit 25, the extraction unit 22B, the prediction unit 23B, and the storage unit 24.

The result reflection region setting unit 25 has a function of setting a result reflection region that is a region having a predetermined size equal to or less than a size of the subsection image, the result reflection region for reflecting a prediction result of the subsection image. The result reflection region is a region for finally reflecting the prediction result related to the state of dry eye of the subject's eye with respect to the ophthalmic image. In the seventh embodiment, the range of the subsection image used for prediction processing and the range in which the prediction result is reflected are the same region, but in this eighth embodiment, a result reflection region having a size equal to or less than the size of the subsection image used for prediction processing is set. That is, an image having a relatively large size is used for prediction processing, but a result reflection region having a relatively small size is used as a region for reflecting the result. The result reflection region may be set based on any regularity, but for example, it is preferable to fill the ophthalmic image with a plurality of result reflection regions without gaps. This result reflection region is a region set on a one-to-one basis with the subsection image. The set result reflection region is stored in the storage unit 24.

The extraction unit 22B has a function of extracting, as the subsection image, a region that includes the result reflection region and has a predetermined size equal to or greater than the result reflection region so as to correspond to each of the result reflection regions. The positional relationship between the subsection image and the result reflection region may be any relationship as long as the result reflection region is included, and, for example, it is conceivable to extract the subsection image such that the result reflection region is positioned at the center of the subsection image. As an example, an example is conceivable in which the result reflection region is set to a size of vertical 20 pixels×horizontal 20 pixels, and the subsection image is extracted in a size of vertical 48 pixels×horizontal 48 pixels such that the result reflection region is positioned at the center. Note that, since a subsection image having a size equal to or greater than the result reflection region is extracted with reference to the set result reflection region, two subsection images respectively corresponding to adjacent two result reflection regions sometimes include overlapping pixel regions. The extracted subsection image is stored in the storage unit 24.

The prediction unit 23B has a function of predicting the state of dry eye of the subject's eye for each subsection image on the basis of a learned model in which learned has been performed in advance, and further has a function of reflecting the prediction result obtained for each subsection image into a corresponding result reflection region. In a case where a plurality of result reflection regions is set for one ophthalmic image, the same number of subsection images as the result reflection regions have been extracted, and therefore, the prediction processing is sequentially executed for the plurality of subsection images, and the obtained prediction result is reflected to the corresponding result reflection region. The reflection result for the result reflection region having been obtained is stored in the storage unit 24. Alternatively, an image indicating the prediction result for each result reflection region may be superimposed and displayed on the ophthalmic image, and may be output to the display device 50. Note that the learning processing for obtaining the learned model used in the prediction unit 23B is similar to that of the seventh embodiment, and thus description is omitted.

Figure 25:
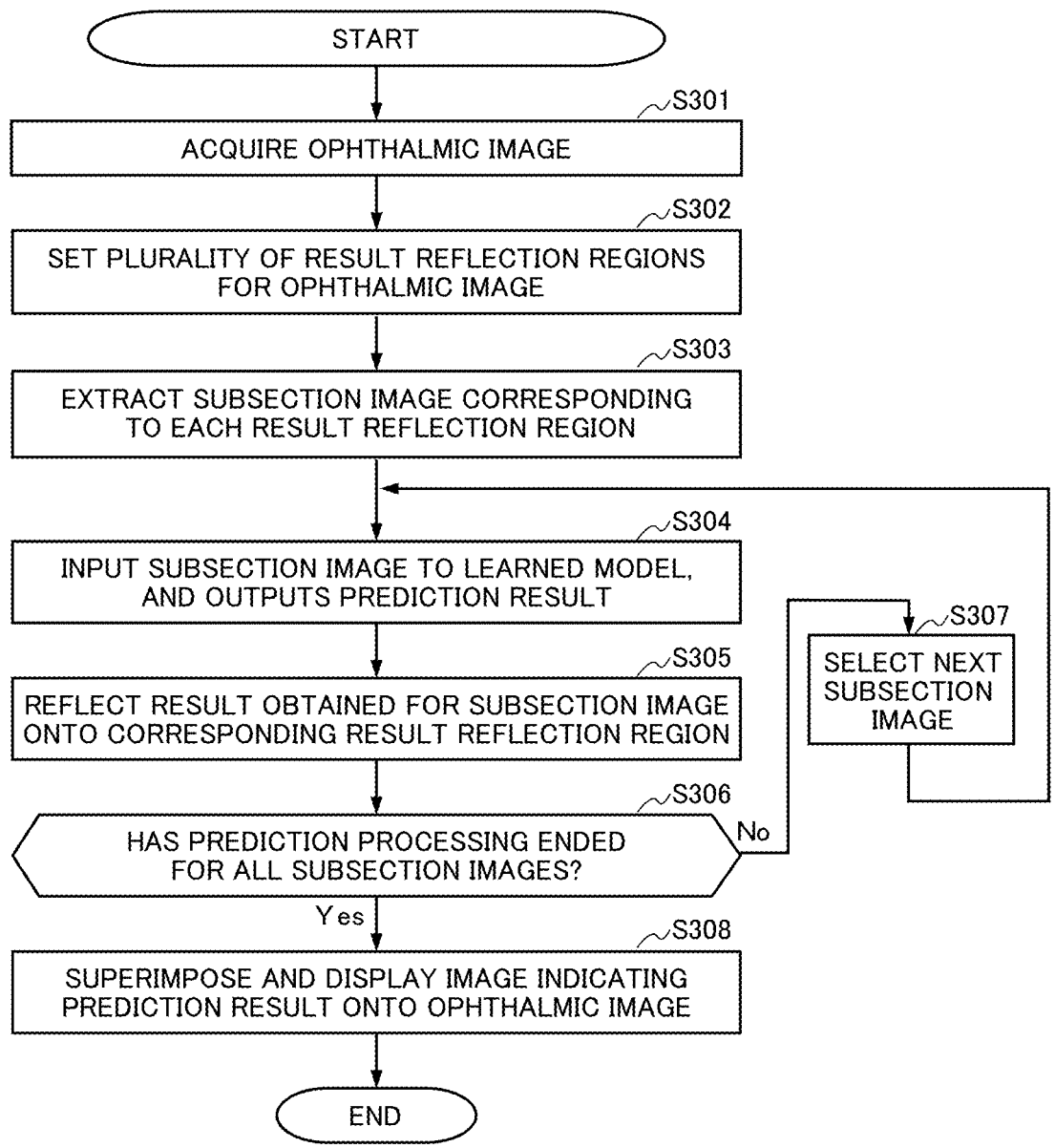
FIG. 25 is a flowchart that presents an example of a flow of prediction processing corresponding to at least one of the embodiments of the present invention.

Next, the flow of prediction processing corresponding to at least one of the embodiments of the present invention will be described. FIG. 25 is a flowchart that presents an example of the flow of the prediction processing corresponding to at least one of the embodiments of the present invention. In FIG. 25, the prediction processing is started when the ophthalmic image processing device 20B acquires an ophthalmic image for test (step S301). Next, the ophthalmic image processing device 20B sets a plurality of result reflection regions for the acquired ophthalmic image (step S302). The ophthalmic image processing device 20B extracts a subsection image corresponding to each result reflection region (step S303). Next, the ophthalmic image processing device 20B inputs the subsection image to the learned model for which learning has been performed in advance regarding predicting the state of dry eye of the subject's eye, executes the prediction processing, and obtains the prediction result (step S304). The ophthalmic image processing device 20B reflects the prediction result obtained for the subsection image onto the corresponding result reflection region (step S305). Then, the ophthalmic image processing device 20B determines whether or not the prediction processing has ended for all the subsection images (step S306). If the prediction processing has not ended for all the subsection images (S306—No), the ophthalmic image processing device 20B selects the next subsection image (step S307), and then returns to step S304. Thus, the prediction processing is sequentially executed for the subsection images, and when the prediction processing is ended for all the subsection images (S306—Yes), the ophthalmic image processing device 20B superimposes and displays an image indicating a prediction result onto the ophthalmic image (step S308), and ends the prediction processing.

Figure 26A:
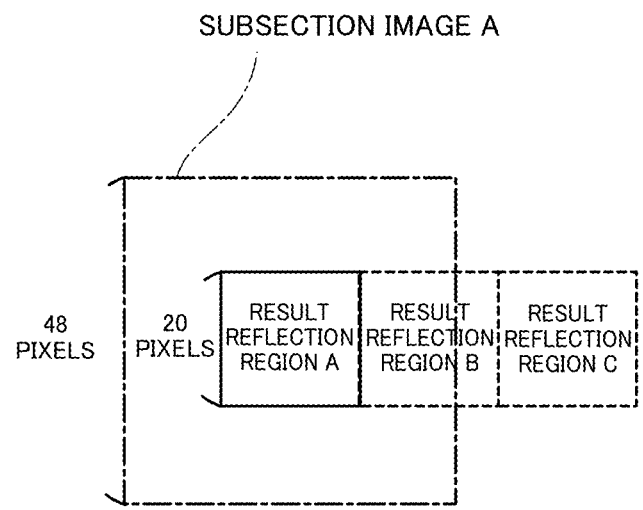
FIG. 26 is an explanatory diagram for explaining an example of setting a result reflection region and a subsection image.
Figure 26B:
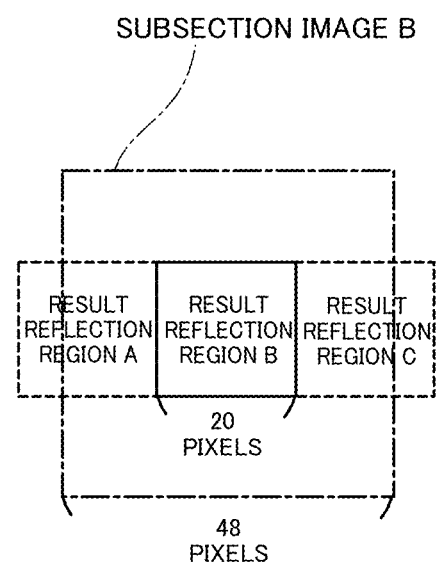

FIG. 26 is an explanatory diagram for explaining an example of setting a result reflection region and a subsection image. As an example, it is assumed that result reflection regions A, B, and C of the size of vertical 20 pixels× horizontal 20 pixels are set adjacent to one another. In this situation, it is assumed that subsection images A, B, and C respectively corresponding to the result reflection regions A, B, and C are extracted in the size of vertical 48 pixels× horizontal 48 pixels such that the result reflection region is positioned at the center. As illustrated in FIG. 26(*a*), it is seen that the subsection image A is extracted such that the result reflection region A is positioned at the center. As illustrated in FIG. 26(*b*), it is seen that the subsection image B corresponding to the adjacent result reflection region B is extracted in a form including a pixel region overlapping the subsection image A.

As described above, since one aspect of the eighth embodiment further includes a result reflection region setting unit that sets a result reflection region that is a region having a predetermined size equal to or less than a size of the subsection image, the result reflection region for reflecting a prediction result of the subsection image, in which the extraction unit extracts, as the subsection image, a region that includes the result reflection region and has a predetermined size equal to or greater than the result reflection region so as to correspond to each of the result reflection regions, and the prediction unit reflects the prediction result obtained for each subsection image into a corresponding result reflection region, the result reflection region reflecting the prediction result is set to a smaller size while setting a larger subsection image size so as to improve the correct answer rate of prediction for the processing of predicting the state of dry eye of the subject's eye, and thus it is possible to obtain a result image with high resolution while maintaining prediction accuracy. That is, in a case of superimposing and displaying an image indicating a prediction result onto the ophthalmic image, a result display screen has low resolution if the prediction result based on the subsection image having a large size is superimposed and displayed in the size of the subsection image as it is. However, by reflecting the prediction result onto a result reflection region smaller than the subsection image as in the present example, it is possible to obtain a result image with high resolution while maintaining prediction accuracy.

Ninth Embodiment

In addition to the configurations of the seventh and eighth embodiments, the prediction unit 23 may calculate a mean luminance value for each of the subsection images and set a subsection image having a mean luminance value equal to or greater than a predetermined threshold as a target of prediction processing.

It is said that a location unnecessary for prediction of the state of dry eye of the subject's eye, such as a location outside the field of view in the ophthalmic image or a location of eyelash, is black (dark) and has a very low luminance value. Since it is obvious that such location does not include a target to be extracted as the state of dry eye of the subject's eye, if such location can be excluded from the target of prediction processing, the processing time required for the prediction processing can be shortened. Therefore, the prediction unit 23 calculates a mean luminance value for each subsection image, and sets a subsection image having a mean luminance value equal to or greater than a predetermined threshold as a target of prediction processing, and excludes a subsection image having a mean luminance value less than the predetermined threshold from the target of prediction processing, so that it is possible to remove a site unnecessary for analysis, and it is possible to improve the inference accuracy due to elimination of inference of the unnecessary site. It is possible to shorten the processing time required for the prediction processing.

Note that, by setting a subsection image having a mean luminance value of this ninth embodiment less than a predetermined threshold to be excluded from the target of prediction processing, a location outside the field of view, a location of the eyelash, and the like are removed, and furthermore, by causing learning to predict that the eyelashes, the contours, and the like are excluded from the target of extraction at the stage of learning with respect to the learned model, it becomes possible to determine (predict to classify into "excluded from target" or "others") that the subsection image mainly including an eyelash and a contour that exists in the subsection image having a mean luminance value equal to or greater than the predetermined threshold is excluded from the target also at the time of prediction processing by the prediction unit 23. Thus, by removing and excluding, from the target, unnecessary locations such as a location outside the field of view and a location of eyelashes by the two means, it is possible to further expect an increase in prediction speed and improvement in prediction accuracy.

Tenth Embodiment

In the seventh to ninth embodiments, it has been described that the prediction unit 23 predicts the state of dry eye of the subject's eye, but the output content of the prediction unit 23 has not been mentioned. The learned model used for prediction processing of the prediction unit 23 has three output nodes in order to output likelihood of three states of P type (state of healthy subject), C type (state of evaporative dry eye), and J type (state of tear decreasing dry eye). The likelihood of each type related to the state of dry eye of the subject's eye is expressed by a numerical value in a range of 0 to 1.0 for each type, and is output such that the sum of the likelihood of all types becomes 1.0. Therefore, the prediction result for each subsection image does not become output of a complete C type (output of C type is 1.0) or a complete J type (output of J type is 1.0) but becomes output likeliest to be C type (output of C type is 0.8) or output likeliest to be J type (output of J type is 0.7). Therefore, in some cases, there can be output including two elements, for example, an intermediate state between P type and C type or an intermediate state between P type and J type. As described above, the numerical value of likelihood of each type may be output between 0 and 1.0 and processed, or may be completely classified into any type with the type having the largest value of likelihood being 1.0 and with likelihood of the other types being 0.

For the likelihood of each type obtained as prediction result of each subsection image, an integrated value of the prediction results of all the subsection images included in one ophthalmic image is calculated, and a value obtained by dividing the integrated value of each type by the total number of subsection images can be an index for judging which type to be classified into when the entire image is viewed. If the integrated value of C type is large, the ophthalmic image indicates how much moisture is insufficient (evaporative dry eye), and if the integrated value of J type is large, the ophthalmic image indicates how much lipid is insufficient (tear decreasing dry eye), so that it can be used as an index of dry eye treatment.

Figure 27A:
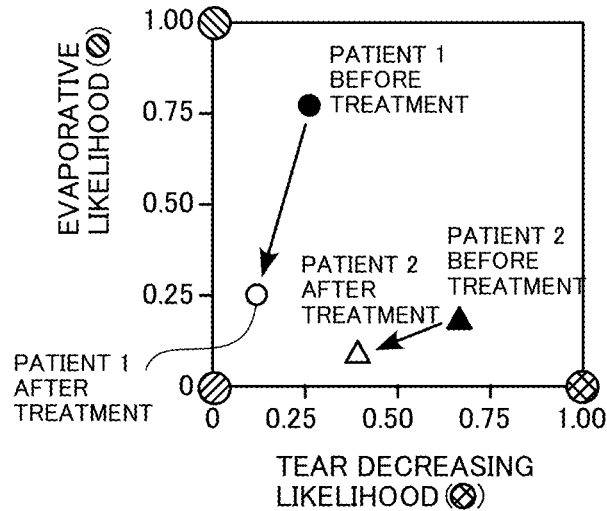
FIG. 27 is an explanatory diagram related to a graph for plotting and expressing likelihood of a state of dry eye of a subject's eye.
Figure 27B:
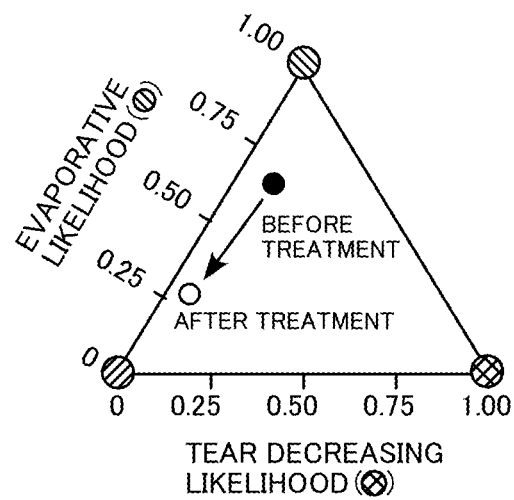

FIG. 27 is an explanatory diagram related to a graph for plotting and expressing likelihood of the state of dry eye of a subject's eye. FIG. 27 illustrates the integrated value of likelihood for each type of ophthalmic image calculated as described above plotted on a graph. For example, by plotting the numerical values before and after the treatment on the graph, the effect of the treatment can be visualized, so that it is easy to describe to the patient and is very effective. The axes of the two dry eye types excluding the healthy type may be orthogonal as illustrated in FIG. 27(*a*), or may be set at an appropriate angle, for example, as illustrated in FIG. 27(*b*), the points of the healthy, the tear decreasing dry eye, and the evaporative dry eye may be arrayed at the vertices of an equilateral triangle. The quantification of the plot points using the integrated value may be performed from only one ophthalmic image, or may be performed using a plurality of consecutive ophthalmic images or some of discrete ophthalmic images.

Eleventh Embodiment

In the seventh to tenth embodiments, the case of executing prediction processing on one ophthalmic image has been described, but the present invention is not limited to this. That is, the image acquisition unit 21 may acquire a plurality of ophthalmic images arranged in time series, the prediction unit 23 may execute prediction processing for each of the plurality of ophthalmic images, and a change determination unit may be further provided to determine whether or not a temporal change and/or a spatial change in the state of dry eye of a subject's eye satisfies a predetermined condition for a prediction result obtained for each of the plurality of ophthalmic images.

In a case of evaluating the state of dry eye of a subject's eye, there is information obtained by evaluating one ophthalmic image, but there is also information obtained by considering a temporal change and a spatial change in prediction results for a plurality of ophthalmic images arranged in time series. For example, examples of the temporal change include evaluating how long in elapse of time after blinking the state of the subject's eye is detected, calculating the state of dry eye of the subject's eye of the target and the number of the predicted subsection images for each ophthalmic image and the ratio of the state of dry eye of the subject's eye of the target in the entire ophthalmic image, and evaluate how much temporal change the number and ratio of the state of dry eye of the subject's eye of the target exceed the predetermined threshold with when the temporal change is followed. It is conceivable to detect that the gradient of the temporal change of the ratio of the state of dry eye of the subject's eye is equal to or greater than a predetermined condition. Examples of the spatial change include evaluation as to how the location where the state of dry eye of the subject's eye to be a target is detected moves.

Figure 28:
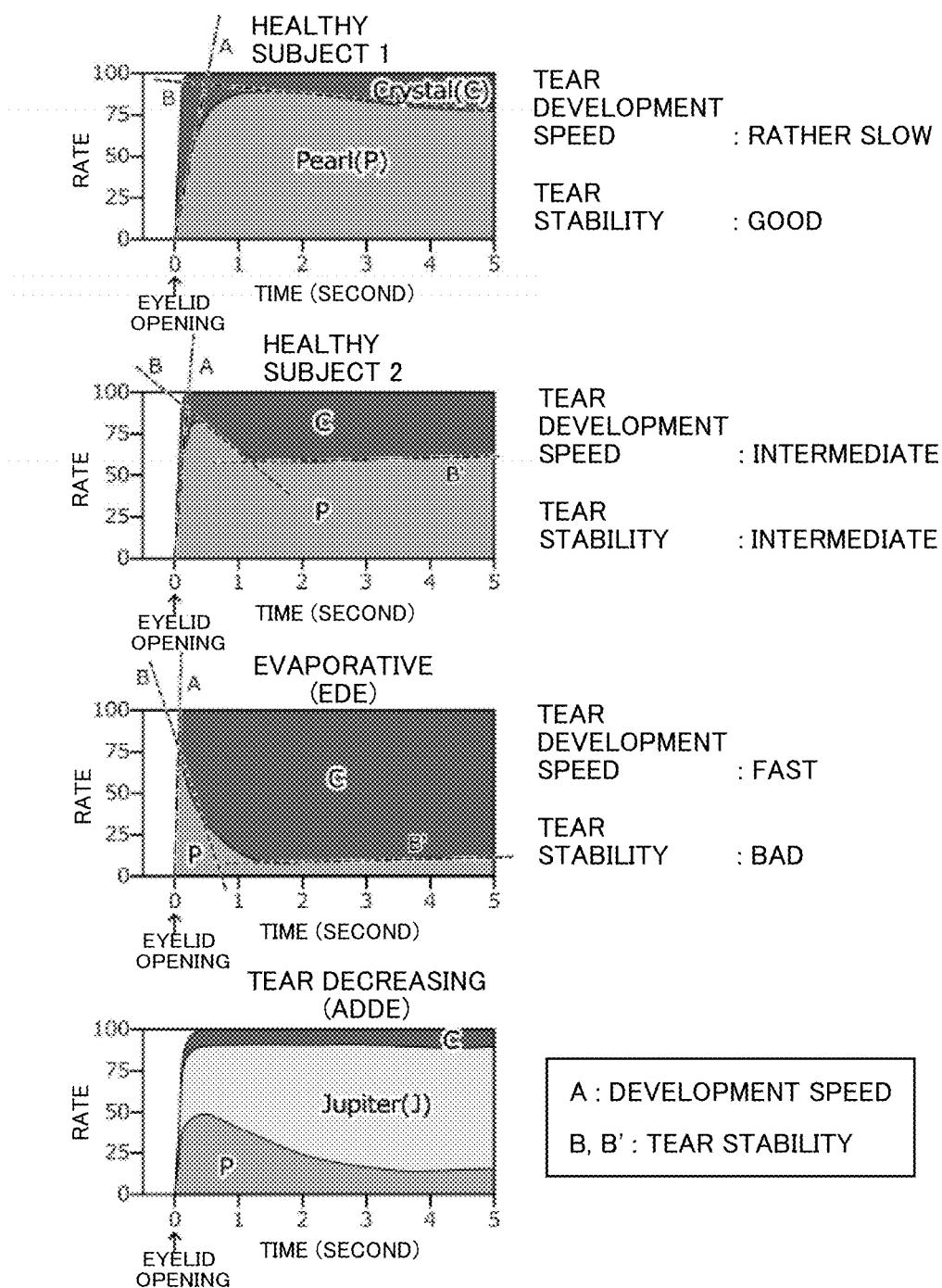
FIG. 28 is an explanatory diagram that illustrates an example of dynamic analysis related to a state of dry eye of a subject's eye.

FIG. 28 is an explanatory diagram that illustrates an example of dynamic analysis related to the state of dry eye of a subject's eye. In FIG. 28, a plurality of ophthalmic images arranged in time series is acquired by a method such as moving image shooting, a ratio (rate) of the three states of P type (state of healthy subject), C type (state of evaporative dry eye), and J type (state of tear decreasing dry eye) is calculated for each ophthalmic image, and a temporal change of the ratio of the three states is represented. In FIG. 28, the vertical axis represents the rate of healthy (P), tear decreasing (J), and evaporative (C), and the horizontal axis represents the time axis. By graphing in this manner, the dynamics of the tear state can be visualized. Among the four graphs illustrated in FIG. 28, the upper two graphs are graphs representing dynamics analysis of healthy subjects (those free from dry eye), the third graph is a graph representing dynamics analysis of a patient with evaporative dry eye (EDE), and the last graph is a graph representing dynamics analysis of a patient with tear decreasing dry eye (ADDE). As seen from the four graphs illustrated in FIG. 28, there are features that cannot be observed until dynamics analysis is performed. For example, an increase in the rate of P type after opening the eyelid indicates a state in which a region in which the state of the lipid layer of tear is good spreads upward from the lower eyelid, and a gradient A (one-dot chain line) on the graph becomes an index of the balance between the lipid layer and the water layer. A gradient B (broken line) indicating the process in which the rate of P type reaches the plateau and decreases and a gradient B' indicating the steadiness that follows can be used as an index indicating the stability of tear. Similarly, in diagnosis of tear decreasing dry eye in a situation in which the moisture decreases but the secretion of lipid is large, the rate of P type may be used, but the rate of J type may be focused. By using these numerical values, it is not easy to distinguish on the image, but it is possible to know the balance between water and lipid, and it is possible to support selection of a treatment method. Note that, in a case of acquiring a plurality of ophthalmic images by moving image shooting, analysis may be performed for all frames, but since inference is time-taking, appropriate thinning may be performed within a range in which dynamics analysis is not hindered, for example, analysis may be performed every three frames.

Thus, by determining whether or not a temporal change and/or a spatial change in the state of dry eye of a subject's eye satisfies a predetermined condition, it becomes possible to evaluate information that cannot be evaluated only by the prediction result for a single ophthalmic image.

REFERENCE SIGNS LIST 100 ophthalmic image processing system
10 server device
20, 201 to 20n terminal device
20, 20A to 20C ophthalmic image processing device
2001 CPU
2002 GPU
2003 memory
2004 I/F
21 image acquisition unit
22, 22B, 22C extraction unit
23, 23B, 23C prediction unit
24 storage unit
241 learned model
25 result reflection region setting unit
40 shooting device
41 light source
42 lens
43 splitter
44 objective lens
45 anterior eye part
46 imaging lens
47 imaging element
50 display device

The invention claimed is:

1. An ophthalmic image processing method for evaluating a state of a subject's eye from an ophthalmic image in which a subject's eye is shot using machine learning, the ophthalmic image processing method comprising:
a learning step of, in order to learn a state of a subject's eye set in advance as a prediction target, obtaining a learned model by performing learning with respect to a neural network in advance regarding extracting a plurality of subsection images from an ophthalmic image for learning, and predicting a state of a subject's eye for each subsection image by machine learning using correct answer data related to the state of the subject's eye of each subsection image;
an image acquisition step of acquiring an ophthalmic image for a test;
an extraction step of extracting a plurality of subsection images from an ophthalmic image for a test; and
a prediction step of predicting a state of a subject's eye of each subsection image using the learned model, wherein
the extraction of the plurality of subsection images is performed from the ophthalmic image after a predetermined image size is set for each state of a subject's eye that is the prediction target such that a detection correct answer rate becomes equal to or greater than a predetermined value in verification in advance regarding a relationship between a size of a subsection image and a detection correction rate of a state of a subject's eye.

2. The ophthalmic image processing method according to claim 1, further comprising a result reflection region setting step of setting a result reflection region that is a region having a predetermined size equal to or less than a size of the subsection image, the result reflection region for reflecting a prediction result of the subsection image, wherein
in the extraction step, a region that includes the result reflection region and has a predetermined size equal to or greater than the result reflection region is extracted as the subsection image so as to correspond to each of the result reflection regions, and
in the prediction step, a prediction result obtained for each of the subsection images is reflected to the result reflection region that corresponds.

3. The ophthalmic image processing method according to claim 2, further comprising an edge image generation step of extracting an edge from the ophthalmic image to generate an edge image, wherein in the prediction step, when a luminance value in the edge image corresponding to a position of the result reflection region is equal to or greater than a predetermined threshold, the subsection image corresponding to the result reflection region is set as a target of prediction processing.

4. The ophthalmic image processing method according to claim 1, wherein in the prediction step, a mean luminance value is calculated for each of the subsection images, and the subsection image having a mean luminance value equal to or greater than a predetermined threshold is set as a target of prediction processing.

5. The ophthalmic image processing method according claim 1, further comprising a prediction result display step of causing a display means to display an image indicating a prediction result superimposed and displayed on the ophthalmic image.

6. The ophthalmic image processing method according to claim 1, wherein
in the image acquisition step, a plurality of ophthalmic images arranged in time series is acquired,
in the prediction step, prediction processing is executed for each of a plurality of ophthalmic images, and
the ophthalmic image processing method further includes a change determination step of determining whether or not a temporal change and/or a spatial change in a state of a subject's eye satisfies a predetermined condition for a prediction result obtained for each of a plurality of ophthalmic images.

7. The ophthalmic image processing method according to claim 1, wherein a state of the subject's eye is presence or absence of an interference fringe of a tear film.

8. The ophthalmic image processing method according to claim 1, wherein a state of the subject's eye is presence or absence of a break.

9. The ophthalmic image processing method according to claim 1, wherein
in the learning step, the learned model is obtained by performing learning with respect to the neural network in advance regarding extracting the plurality of subsection images from the ophthalmic image for learning, and, predicting by machine learning, for each of the subsection images, at least which of a healthy state, a state of tear decreasing dry eye, and a state of evaporative dry eye the state of dry eye of the subject's eye corresponds to, using the correct answer data related to the state of dry eye of the subject's eye of each of the subsection images, and
the plurality of subsection images are extracted from the ophthalmic image after an image size is set such that a detection correct answer rate becomes equal to or greater than a predetermined value in verification in advance regarding a relationship between a size of a subsection image and a detection correction rate of the state of dry eye of the subject's eye.

10. The ophthalmic image processing method according to claim 9, further comprising a result reflection region setting step of setting a result reflection region that is a region having a predetermined size equal to or less than a size of the subsection image, the result reflection region for reflecting a prediction result of the subsection image, wherein
in the extraction step, a region that includes the result reflection region and has a predetermined size equal to or greater than the result reflection region is extracted as the subsection image so as to correspond to each of the result reflection regions, and
in the prediction step, a prediction result obtained for each of the subsection images is reflected to the result reflection region that corresponds.

11. The ophthalmic image processing method according to claim 10, further comprising an edge image generation step of extracting an edge from the ophthalmic image to generate an edge image, wherein
in the prediction step, when a luminance value in the edge image corresponding to a position of the result reflection region is equal to or greater than a predetermined threshold, the subsection image corresponding to the result reflection region is set as a target of prediction processing.

12. The ophthalmic image processing method according to claim 9, wherein in the prediction step, a mean luminance value is calculated for each of the subsection images, and the subsection image having a mean luminance value equal to or greater than a predetermined threshold is set as a target of prediction processing.

13. The ophthalmic image processing method according to claim 9, further comprising a prediction result display step of causing a display means to display an image indicating a prediction result superimposed on the ophthalmic image.

14. The ophthalmic image processing method according to claim 9, wherein
in the image acquisition step, a plurality of ophthalmic images arranged in time series are acquired,
in the prediction step, prediction processing is executed for each of a plurality of ophthalmic images, and
the ophthalmic image processing method further includes a change determination step of determining whether or not a temporal change and/or a spatial change in a state of dry eye of a subject's eye satisfies a predetermined condition for a prediction result obtained for each of a plurality of ophthalmic images.

15. An ophthalmic image processing device for evaluating a state of a subject's eye from an ophthalmic image in which a subject's eye is shot, the ophthalmic image processing device comprising:
an image acquisition unit that acquires the ophthalmic image of an evaluation target;
an extraction unit that extracts a plurality of subsection images from the ophthalmic image; and
a prediction unit that in order to learn a state of a subject's eye set in advance as a prediction target, predicts a state of a subject's eye for each of the subsection images based on a learned model in which learning has been performed with respect to a neural network in advance regarding extracting a plurality of subsection images from an ophthalmic image for learning, and predicting a state of a subject's eye for the each of subsection image by machine learning using correct answer data related to the state of the subject's eye of each subsection image, wherein
the subsection image is extracted from the ophthalmic image after an image size is set for each state of a subject's eye that is the prediction target such that a detection correct answer rate becomes equal to or greater than a predetermined value in verification in advance regarding a relationship between a size of a subsection image and a detection correction rate of a state of a subject's eye.

16. The ophthalmic image processing device according to claim 15, further comprising a result reflection region setting unit that sets a result reflection region that is a region having a predetermined size equal to or less than a size of the subsection image, the result reflection region for reflecting a prediction result of the subsection image, wherein the extraction unit extracts a region that includes the result reflection region and has a predetermined size equal to or greater than the result reflection region as the subsection image so as to correspond to each of the result reflection regions, and the prediction unit reflects a prediction result obtained for each of the subsection images to the result reflection region that corresponds.

17. The ophthalmic image processing device according to claim 15, wherein the prediction unit predicts the state of dry eye of the subject's eye for each of the subsection images based on the learned model in which the learning has been performed with respect to a neural network in advance regarding extracting the plurality of subsection images from the ophthalmic image for learning, and predicting by machine learning, for each of the subsection images, at least which of a healthy state, a state of tear decreasing dry eye, and a state of evaporative dry eye the state of dry eye of the subject's eye corresponds to, using correct answer data related to the state of dry eye of the subject's eye of each of the subsection images, and each of the subsection images is extracted from the ophthalmic image after an image size is set such that a detection correct answer rate becomes equal to or greater than a predetermined value in verification in advance regarding a relationship between a size of a subsection image and a detection correction rate of the state of dry eye of the subject's eye.

18. A non-transitory computer-readable medium storing an ophthalmic image processing program which, when executed, causes a computer to perform processing of evaluating a state of a subject's eye from an ophthalmic image in which a subject's eye is shot, the ophthalmic image processing program, when executed, causing the computer to implement:

an image acquisition function of acquiring the ophthalmic image of an evaluation target;

an extraction function of extracting a plurality of subsection images from the ophthalmic image; and a prediction function of, in order to learn a state of a subject's eye set in advance as a prediction target, predicting a state of a subject's eye for each of the subsection images based on a learned model in which learning has been performed with respect to a neural network in advance regarding extracting a plurality of subsection images from an ophthalmic image for learning, and predicting a state of a subject's eye for the each of subsection images by machine learning using correct answer data related to the state of the subject's eye of each subsection image, wherein the subsection image is extracted from the ophthalmic image after an image size is set for each state of a subject's eye that is the prediction target such that a detection correct answer rate becomes equal to or greater than a predetermined value in verification in advance regarding a relationship between a size of a subsection image and a detection correction rate of a state of a subject's eye.

19. The non-transitory computer-readable medium according to claim 18, the ophthalmic image processing program, when executed, further causing the computer to implement a result reflection region setting function of setting a result reflection region that is a region having a predetermined size equal to or less than a size of the subsection image, the result reflection region for reflecting a prediction result of the subsection image, wherein the extraction function extracts a region that includes the result reflection region and has a predetermined size equal to or greater than the result reflection region as the subsection image so as to correspond to each of the result reflection regions, and the prediction function reflects a prediction result obtained for each of the subsection images to the result reflection region that corresponds.

20. The non-transitory computer-readable medium according to claim 18, wherein the prediction function predicts the state of dry eye of the subject's eye for each of the subsection images based on the learned model in which the learning has been performed with respect to the neural network in advance regarding extracting the plurality of subsection images from the ophthalmic image for learning, and, predicting by machine learning, for each of the subsection images, at least which of a healthy state, a state of tear decreasing dry eye, and a state of evaporative dry eye the state of dry eye of the subject's eye corresponds to, using the correct answer data related to the state of dry eye of the subject's eye of each of the subsection images, and each of the subsection images is extracted from the ophthalmic image after an image size is set such that a detection correct answer rate becomes equal to or greater than a predetermined value in verification in advance regarding a relationship between a size of a subsection image and a detection correction rate of the state of dry eye of the subject's eye.

* * * * *